US012051429B2

(12) United States Patent
Kim et al.

(10) Patent No.: US 12,051,429 B2
(45) **Date of Patent: *Jul. 30, 2024**

(54) TRANSFORM AMBISONIC COEFFICIENTS USING AN ADAPTIVE NETWORK FOR PRESERVING SPATIAL DIRECTION

(71) Applicant: QUALCOMM Incorporated, San Diego, CA (US)

(72) Inventors: Lae-Hoon Kim, San Diego, CA (US); Shankar Thagadur Shivappa, San Diego, CA (US); S M Akramus Salehin, San Diego, CA (US); Shuhua Zhang, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,684

(22) Filed: Apr. 24, 2023

(65) Prior Publication Data

US 2023/0260525 A1 Aug. 17, 2023

Related U.S. Application Data

(63) Continuation of application No. 17/210,357, filed on Mar. 23, 2021, now Pat. No. 11,636,866.

(Continued)

(51) Int. Cl.

*G10L 19/008* (2013.01)
*G10L 19/002* (2013.01)

(Continued)

(52) U.S. Cl.

CPC .......... *G10L 19/038* (2013.01); *G10L 19/002* (2013.01); *H04R 5/00* (2013.01);

(Continued)

(58) Field of Classification Search

CPC ............... G10L 19/008; H04S 2420/11; H04R 2430/21

See application file for complete search history.

(56) References Cited

U.S. PATENT DOCUMENTS

| | | | |
|---|---|---|---|
| 10,262,665 B2 | 4/2019 | Seo et al. | |
| 10,419,867 B2 | 9/2019 | Seo et al. | |

(Continued)

FOREIGN PATENT DOCUMENTS

| | | | |
|---|---|---|---|
| CN | 110544484 A | 12/2019 | |
| WO | 2017023313 A1 | 2/2017 | |
| WO | WO-2017023313 A1 * | 2/2017 | ......... B60R 11/0247 |

OTHER PUBLICATIONS

International Search Report and Written Opinion—PCT/US2021/023800—ISA/EPO—Jun. 29, 2021.

*Primary Examiner* — Feng-Tzer Tzeng

(74) *Attorney, Agent, or Firm* — QUALCOMM Incorporated; Espartaco Diaz Hidalgo

(57) ABSTRACT

A device includes a memory configured to store untransformed ambisonic coefficients at different time segments. The device includes one or more processors configured to obtain the untransformed ambisonic coefficients at the different time segments, where the untransformed ambisonic coefficients at the different time segments represent a soundfield at the different time segments. The one or more processors are configured to apply one adaptive network, based on a constraint that includes preservation of a spatial direction of one or more audio sources in the soundfield at the different time segments, to the untransformed ambisonic coefficients at the different time segments to generate transformed ambisonic coefficients at the different time segments, wherein the transformed ambisonic coefficients at the different time segments represent a modified soundfield at the different time segments, that was modified based on the (Continued)

constraint. The one or more processors are also configured to apply an additional adaptive network.

30 Claims, 14 Drawing Sheets

Related U.S. Application Data

(60) Provisional application No. 62/994,147, filed on Mar. 24, 2020, provisional application No. 62/994,158, filed on Mar. 24, 2020.

(51) Int. Cl.
*G10L 19/038* (2013.01)
*H04R 5/00* (2006.01)

(52) U.S. Cl.
CPC ........ *G10L 19/008* (2013.01); *H04R 2430/21* (2013.01); *H04S 2420/11* (2013.01)

(56) References Cited

U.S. PATENT DOCUMENTS

| | | | | |
|---|---|---|---|---|
| 11,636,866 | B2 | 4/2023 | Kim et al. | |
| 2012/0155653 | A1* | 6/2012 | Jax | H04H 20/89 381/23 |
| 2014/0358558 | A1 | 12/2014 | Sen et al. | |
| 2017/0076717 | A1* | 3/2017 | Parada San Martin | G06F 1/3203 |
| 2018/0068664 | A1* | 3/2018 | Seo | H04S 3/008 |
| 2018/0324542 | A1* | 11/2018 | Seo | H04R 5/02 |

* cited by examiner

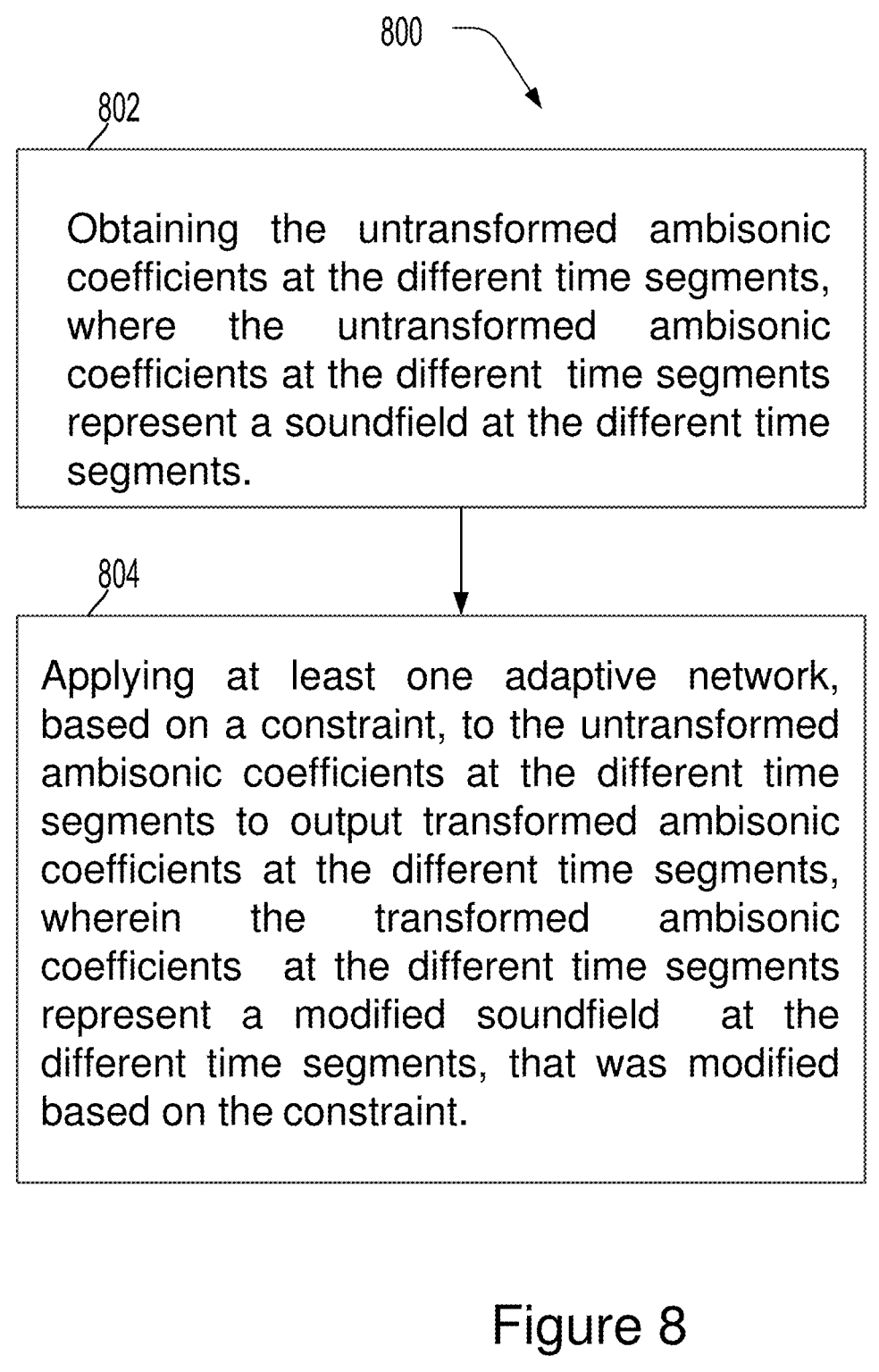

800

802

Obtaining the untransformed ambisonic coefficients at the different time segments, where the untransformed ambisonic coefficients at the different time segments represent a soundfield at the different time segments.

804

Applying at least one adaptive network, based on a constraint, to the untransformed ambisonic coefficients at the different time segments to output transformed ambisonic coefficients at the different time segments, wherein the transformed ambisonic coefficients at the different time segments represent a modified soundfield at the different time segments, that was modified based on the constraint.

Figure 8

TRANSFORM AMBISONIC COEFFICIENTS USING AN ADAPTIVE NETWORK FOR PRESERVING SPATIAL DIRECTION

CLAIM OF PRIORITY UNDER 35 U.S.C. § 119

The present Application is a continuation and claims the benefit of U.S. patent Non-Provisional application Ser. No. 17/210,357, entitled “TRANSFORM AMBISONIC COEFFICIENTS USING AN ADAPTIVE NETWORK, filed on Mar. 23, 2021 which claims benefit of U.S. Provisional Patent Application No. 62/994,158 entitled “TRANSFORM AMBISONIC COEFFICIENTS USING AN ADAPTIVE NETWORK BASED ON OTHER FORM FACTORS THAN IDEAL MICROPHONE ARRAYS” filed Mar. 24, 2020, and Provisional Application No. 62/994,147 entitled “TRANSFORM AMBISONIC COEFFICIENTS USING AN ADAPTIVE NETWORK” filed Mar. 24, 2020 and assigned to the assignee hereof and hereby expressly incorporated by reference herein

FIELD

The following relates generally to ambisonic coefficients generation, and more specifically to transform ambisonic coefficient using an adaptive network.

BACKGROUND

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

The computing capabilities include processing ambisonic coefficients. Ambisonic signals represented by ambisonic coefficients is a three-dimensional representation of a soundfield. The ambisonic signal, or ambisonic coefficient representation of the ambisonic signal, may represent the soundfield in a manner that is independent of local speaker geometry used to playback a multi-channel audio signal rendered from the ambisonic signal.

SUMMARY

A device includes a memory configured to store untransformed ambisonic coefficients at different time segments. The device also includes one or more processors configured to obtain the untransformed ambisonic coefficients at the different time segments, where the untransformed ambisonic coefficients at the different time segments represent a soundfield at the different time segments. The one or more processors are also configured to apply one adaptive network, based on a constraint, to the untransformed ambisonic coefficients at the different time segments to generate transformed ambisonic coefficients at the different time segments, wherein the transformed ambisonic coefficients at the different time segments represent a modified soundfield at the different time segments, that was modified based on the constraint. The one or more processors are also configured to apply an additional adaptive network and an additional constraint input into the additional adaptive network configured to output additional transformed ambisonic coefficients, based on the additional constraint, wherein the additional constraint includes preservation of a different spatial direction than the spatial direction preserved by the constraint.

Aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 8 is a flow chart illustrating a method of performing applying at least one adaptive network, based on a constraint, in accordance with some examples of the present disclosure.

DETAILED DESCRIPTION

Figure 1:
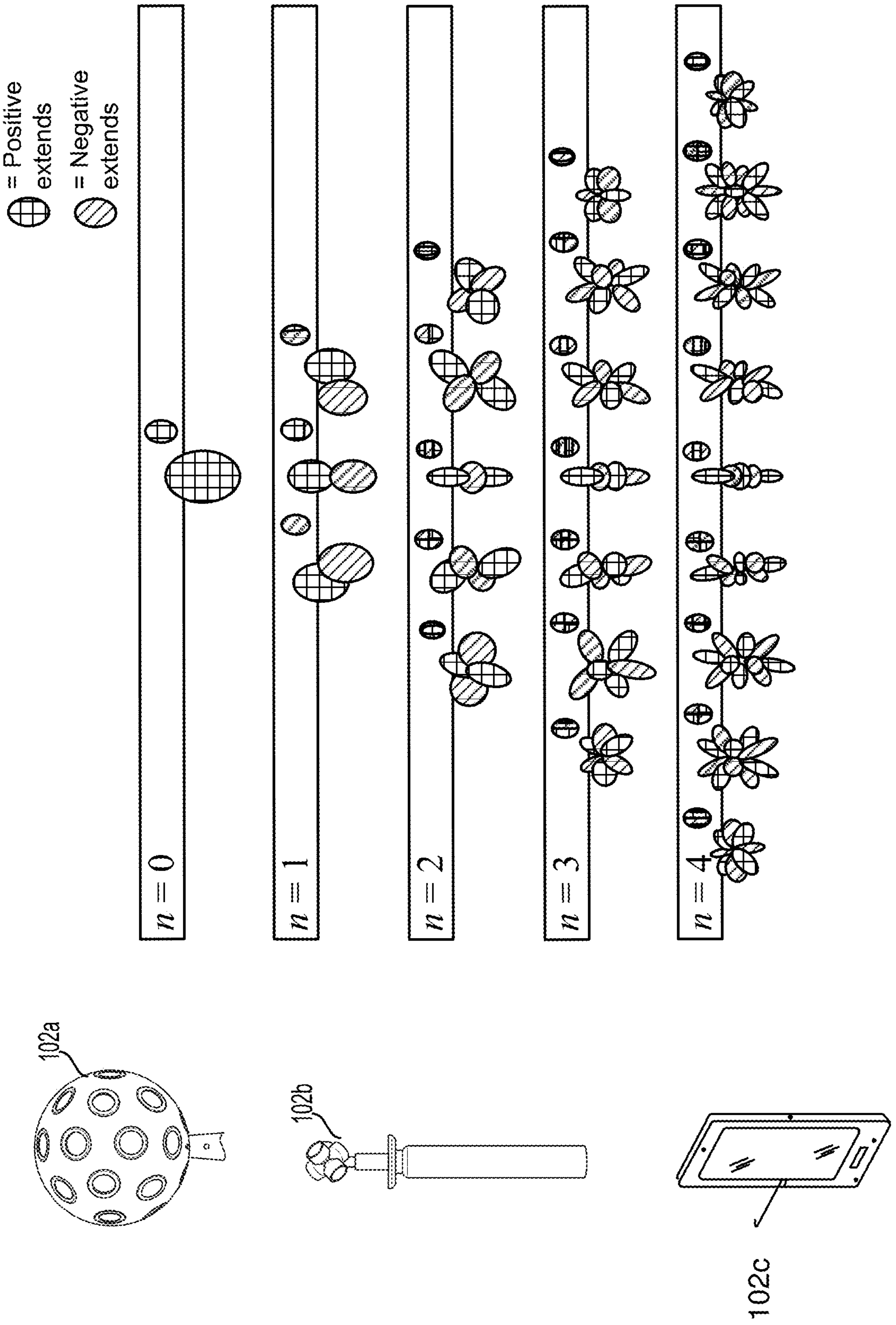
FIG. 1 illustrates an exemplary set of ambisonic coefficients and different exemplary devices that may be used to capture soundfields represented by ambisonic coefficients, in accordance with some examples of the present disclosure.

Audio signals including speech may in some cases be degraded in quality because of interference from another source. The interference may be in the form of physical obstacles, other signals, additive white Gaussian noise (AWGN), or the like. One challenge to removing the interference is when the interference and desired audio signal comes from the same direction. Aspects of the present disclosure relate to techniques for removing the effects of this interference (e.g., to provide for a clean estimate of the original audio signal) in the presence of noise when both the noise and audio signal are traveling in a similar direction. By way of example, the described techniques may provide for using a directionality and/or signal type associated with the source as factors in generating the clean audio signal estimate. Other aspects of the present disclosure relate to transforming ambisonic representations of a soundfield that initially include multiple audio sources to ambisonic representations of a soundfield that eliminate audio sources outside of certain directions.

Ambisonic coefficients represent the entire soundfield; however, it is sometimes desired to spatially filter different audio sources. By way of example, the adaptive network described herein may perform the function of spatial filtering by passing through desired spatial directions and suppressing audio sources from other spatial directions. Moreover, unlike a traditional beamformer which is limited to improving the signal-to-noise ratio (SNR) of an audio signal by 3 dB, the adaptive network described herein improves the SNR by at least an order of magnitude more (i.e., 30 dB). In addition, the adaptive network described herein may preserve the audio characteristics of the passed through audio signal. Traditional signal processing techniques may pass through the audio signal in the desired direction; however, they may not preserve certain audio characteristics, e.g., the amount of reverberation or other transitory audio characteristics that tend to change in time. In addition, the adaptive network described herein may transform ambisonic coefficients in an encoding device or a decoding device.

Consumer audio that uses spatial coding using channel-based surround sound is played through loudspeakers at pre-specified positions. Another approach to spatial audio coding is object-based audio, which involves discrete pulse-code-modulation (PCM) data for single audio objects with associated metadata containing location coordinates of the objects in space (amongst other information). A further approach to spatial audio coding (e.g., to surround-sound coding) is scene-based audio, which involves representing the soundfield using ambisonic coefficients. Ambisonic coefficients have hierarchical basis functions, e.g., spherical harmonic basis functions.

By way of example, the soundfield may be represented in terms of ambisonic coefficients using an expression such as the following:

$$p_i(t, r_r, \theta_r, \varphi_r) = \sum_{\omega=0}^{\infty}\left[4\pi\sum_{n=0}^{\infty} j_n(kr_r)\sum_{m=-n}^{n} A_n^m(k)Y_n^m(\theta_r, \varphi_r)\right]e^{j\omega t}, \quad (1)$$

This expression shows that the pressure $p_i$ at any point $\{r_r, \theta_r, \varphi_r\}$ of the soundfield can be represented uniquely by the ambisonic coefficient $A_n^m(k)$. Here, the wavenumber $$k = \frac{\omega}{c},$$

c is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions of order n and suborder m (some descriptions of ambisonic coefficients represent n as degree (i.e. of the corresponding Legendre polynomial) and m as order). It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform.

FIG. 1 illustrates an exemplary set of ambisonic coefficients of up to $4^{th}$ order (n=4). FIG. 1 also illustrates different exemplary microphone devices (102*a*, 102*b*, 102*c*) that may be used to capture soundfields represented by ambisonic coefficients. The microphone device 102B may be designed to directly output channels that include the ambisonic coefficients. Alternatively, the output channels of the microphone devices 102*a*, and 102*c* may be coupled to a multi-channel audio converter that converts multi-channel audio into an ambisonic audio representation.

The total number of ambisonic coefficients used to represent a soundfield may depend on various factors. For scene-based audio, for example, the total number of number of ambisonic coefficients may be constrained by the number of microphone transducers in the microphone device 102*a*, 102*b*, 102*c*. The total number of ambisonic coefficients may also be determined by the available storage bandwidth or transmission bandwidth. In one example, a fourth-order representation involving 25 coefficients (i.e., $0 \le n \le 4$, $-n \le m \le +n$) for each frequency is used. Other examples of hierarchical sets that may be used with the approach described herein include sets of wavelet transform coefficients and other sets of coefficients of multiresolution basis functions.

The ambisonic coefficient $A_n^m(k)$ may be derived from signals that are physically acquired (e.g., recorded) using any of various microphone array configurations, such as a tetrahedral 102*b*, spherical microphone array 102*a* or other microphone arrangement 102*c*. Ambisonic coefficient input of this form represents scene-based audio. In a non-limiting example, the inputs into the adaptive network 225 are the different output channels of a microphone array 102*b*, which is a tetrahedral microphone array. One example of a tetrahedral microphone array may be used to capture first order ambisonic (FOA) coefficients. Another example of a microphone array may be different microphone arrangements, where after an audio signal is captured by the microphone array the output of the microphone array is used to produce a representation of a soundfield using ambisonic coefficients. For example, "Ambisonic Signal Generation for Microphone Arrays", U.S. Pat. No. 10,477,310B2 (assigned to Qualcomm Incorporated) is directed at a processor configured to perform signal processing operations on signals captured by each microphone array, and perform a first directivity adjustment by applying a first set of multiplicative factors to the signals to generate a first set of ambisonic signals, the first set of multiplicative factors determined based on a position of each microphone in the microphone array, an orientation of each microphone in the microphone array, or both.

In another non-limiting example, the different output channels of the microphone array 102*a* may be converted into ambisonic coefficients by an ambisonics converter. For example, the microphone array may be a spherical array, such as an Eigenmike[R] (mh acoustics LLC, San Francisco, CA). One example of an Eigenmike[R] array is the em32 array, which includes 32 microphones arranged on the surface of a sphere of diameter 8.4 centimeters, such that each of the output signals $p_i(t)$, i=1 to 32, is the pressure recorded at time sample t by microphone i.

In addition, or alternatively, the ambisonic coefficient $A_n^m(k)$ may be derived from channel-based or object-based descriptions of the soundfield. For example, the coefficients $A_n^m(k)$ for the soundfield corresponding to an individual audio source may be expressed as $$A_n^m(k)=g(\omega)(-4\pi ik)h_n^{(2)}(kr_s)Y_n^{m*}(\theta_s, \varphi_s), \quad (2)$$

where i is $\sqrt{-1}$, $h_n^{(2)}(\bullet)$ is the spherical Hankel function (of the second kind) of order n, $\{r_s, \theta_s, \varphi_s\}$ is the location of the audio source, and $g(\omega)$ is the source energy as a function of frequency. It should be noted that an audio source in this context may represent an audio object, e.g., a person speaking, a dog barking, the a car driving by. An audio source may also represent these three audio objects at once, e.g., there is one audio source (like a recording) where there is a person speaking, a dog barking or a car driving by. In such a case, the $\{r_s, \theta_s, \varphi_s\}$ location of the audio source may be represented as a radius to the origin of the coordinate system, azimuth angle, and elevation angle. Unless otherwise expressed, audio object and audio source is used interchangeable throughout this disclosure.

Knowing the source energy $g(\omega)$ as a function of frequency allows us to convert each PCM object and its location into the ambisonic coefficient $A_n^m(k)$. This source energy may be obtained, for example, using time-frequency analysis techniques, such as by performing a fast Fourier transform (e.g., a 256-, -512-, or 1024-point FFT) on the PCM stream. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual audio sources). Essentially, these coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$.

One of skill in the art will recognize that representations of ambisonic coefficients $A_n^m$(or, equivalently, of corresponding time-domain coefficients $a_n^m$) other than the representation shown in expression (2) may be used, such as representations that do not include the radial component. One of skill in the art will recognize that several slightly different definitions of spherical harmonic basis functions are known (e.g., real, complex, normalized (e.g., N3D), semi-normalized (e.g., SN3D), Furse-Malham (FuMa or FMH), etc.), and consequently that expression (1) (i.e., spherical harmonic decomposition of a soundfield) and expression (2) (i.e., spherical harmonic decomposition of a soundfield produced by a point source) may appear in the literature in slightly different form. The present description is not limited to any particular form of the spherical harmonic basis functions and indeed is generally applicable to other hierarchical sets of elements as well.

Different encoding and decoding processes exist with a scene-based approach. Such encoding may include one or more lossy or lossless coding techniques for bandwidth compression, such as quantization (e.g., into one or more codebook indices), redundancy coding, etc. Additionally, or alternatively, such encoding may include encoding audio channels (e.g., microphone outputs) into an Ambisonic format, such as B-format, G-format, or Higher-order Ambisonics (HOA). HOA is decoded using the MPEG-H 3D Audio decoder which may decompress ambisonic coefficients encoded with a spatial ambisonic encoder.

As an illustrative example, the microphone device 102*a*, 102*b* may operate within an environment (e.g., a kitchen, a restaurant, a gym, a car) that may include a plurality of auditory sources (e.g., other speakers, background noise). In such cases, the microphone device 102*a*, 102*b*, 102*c* may be directed (e.g., manually by a user of the device, automatically by another component of the device) towards target audio source in order to receive a target audio signal (e.g., audio or speech). In some cases, the microphone device 102*a*, 102*b*, 102*c* orientation may be adjusted. In some examples, audio interference sources may block or add noise to the target audio signal. It may be desirable to remove or attenuate the interference(s). The attenuation of the interference(s) may be achieved at least in part on a directionality associated with target audio source, a type of the target audio signal (e.g., speech, music, etc.), or a combination thereof.

Beamformers may be implemented with traditional signal processing techniques in either the time domain or spatial frequency domain to reduce the interference for the target audio signal. When the target audio signal is represented using an ambisonic representation, other filtering techniques may be used such as eigen-value decomposition, singular value decomposition, or principal component analysis. However, the above mentioned filtering techniques are computationally expensive and may consume unnecessary power. Moreover, with different form factors and microphone placements, the filters have to be tuned for each device and configuration.

In contrast, the techniques described in this disclosure offer a robust way to filter out the undesired interferences by transforming or manipulating ambisonic coefficient representation using an adaptive network.

Current commercial tools exist today to manipulate ambisonic coefficients. For example, the Facebook 360 Spatial Workstation software suite which includes the FB360 Spatializer audio plugin. Another example is AudioEase 360 pan suite. However, these commercial tools require manual editing of audio files or formats to produce a desired change in a soundfield. In contrast, techniques described in this disclosure may not require manual editing of a file, or format in the inferencing stage after training an adaptive network.

Additional context to the solutions will be described with reference to the Figures and in the detailed description below.

The described techniques may apply to different target signal types (e.g., speech, music, engine noise, animal sounds, etc.). For example, each such target signal type may be associated with a given distribution function (e.g., which may be learned by a given device in accordance with aspects of the present disclosure). The learned distribution function may be used in conjunction with a directionality of the source signal (e.g., which may be based at least in part on a physical arrangement of microphones within the device) to generate the clean signal audio estimate. Thus, the described techniques generally provide for the use of a spatial constraint and/or target distribution function (each of which may be determined based at least in part on an adaptive network (e.g., trained recurrent neural network) to generate the clean signal audio estimate.

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms “a,” “an,” and “the” are intended to include the plural forms as well, unless the context clearly indicates otherwise. It may be further understood that the terms “comprise,” “comprises,” and “comprising” may be used interchangeably with “include,” “includes,” or “including.” Additionally, it will be understood that the term “wherein” may be used interchangeably with “where.” As used herein, “exemplary” may indicate an example, an implementation, and/or an aspect, and should not be construed as limiting or as indicating a preference or a preferred implementation. As used herein, an ordinal term (e.g., “first,” “second,” “third,” etc.) used to modify an element, such as a structure, a component, an operation, etc., does not by itself indicate any priority or order of the element with respect to another element, but rather merely distinguishes the element from another element having a same name (but for use of the ordinal term). As used herein, the term “set” refers to a grouping of one or more elements, and the term “plurality” refers to multiple elements.

As used herein, “coupled” may include “communicatively coupled,” “electrically coupled,” or “physically coupled,” and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, “directly coupled” may include two devices that are coupled (e.g., communicatively coupled, electrically coupled, or physically coupled) without intervening components.

As used herein, "integrated" may include "manufactured or sold with". A device may be integrated if a user buys a package that bundles or includes the device as part of the package. In some descriptions, two devices may be coupled, but not necessarily integrated (e.g., different peripheral devices may not be integrated to a device 201. 800, but still may be "coupled"). Another example may be the any of the transmitter, receiver or antennas described herein that may be "coupled" to one or more processor(s) 208, 810, but not necessarily part of the package that includes the device 201, 800. Yet another example, that the microphone(s) 205 may not be "integrated" to the ambisonic coefficients buffer 215 but may be "coupled". Other examples may be inferred from the context disclosed herein, including this paragraph, when using the term "integrated".

As used herein, "connectivity" or "wireless link" between devices may be based on various wireless technologies, such as Bluetooth, Wireless-Fidelity (Wi-Fi) or variants of Wi-Fi (e.g., Wi-Fi Direct. Devices may be "wirelessly connected" based on different cellular communication systems, such as, a Long Term Evolution (LTE) system, a Code Division Multiple Access (CDMA) system, a Global System for Mobile Communications (GSM) system, a wireless local area network (WLAN) system, 5G, C-V2X or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. In addition, when two devices are within line of sight, a "connectivity" may also be based on other wireless technologies, such as ultrasound, infrared, pulse radio frequency electromagnetic energy, structured light, or directional of arrival techniques used in signal processing (e.g., audio signal processing or radio frequency processing).

As used herein "inference" or "inferencing" refers to when the adaptive network has learned or converged its weights based on a constraint and is making an inference or prediction based on untransformed ambisonic coefficients. An inference does not include a computation of the error between the untransformed ambisonic coefficients and transformed ambisonic coefficients and update of the weights of the adaptive network. During learning or training, the adaptive network learned how to perform a task or series of tasks. During the inference stage, after the learning or training, the adaptive network performs the task or series of tasks that it learned.

As used herein "meta-learning" refers to refinement learning after there is already convergence of the weights of the adaptive network. For example, after general training and general optimization, further refinement learning may be performed for a specific user, so that the weights of the adaptive network can adapt to the specific user. Meta-learning with refinement is not just limited to a specific user. For example, for a specific rendering scenario with local reverberation characteristics, the weights may be refined to adapt to perform better for the local reverberation characteristics.

As used herein A "and/or" B may mean that either "A and B", or "A or B", or both "A and B" and "A or B" are applicable or acceptable.

In associated descriptions of FIGS. 2A-2E constraint blocks are drawn using dashed lines to designate a training phase. Other dashed lines are used around other blocks in FIGS. 2A-2E, FIGS. 3A-3B, FIGS. 4A-4A, FIGS. 5A-D, 7A-7C to designate that the blocks may be optional depending on the context and/or application. If a block is drawn with a solid line but is located within a block with a dashed line, the block with a dashed line along with the blocks within the solid line may be optional depending on the context and/or application.

Figure 2A:
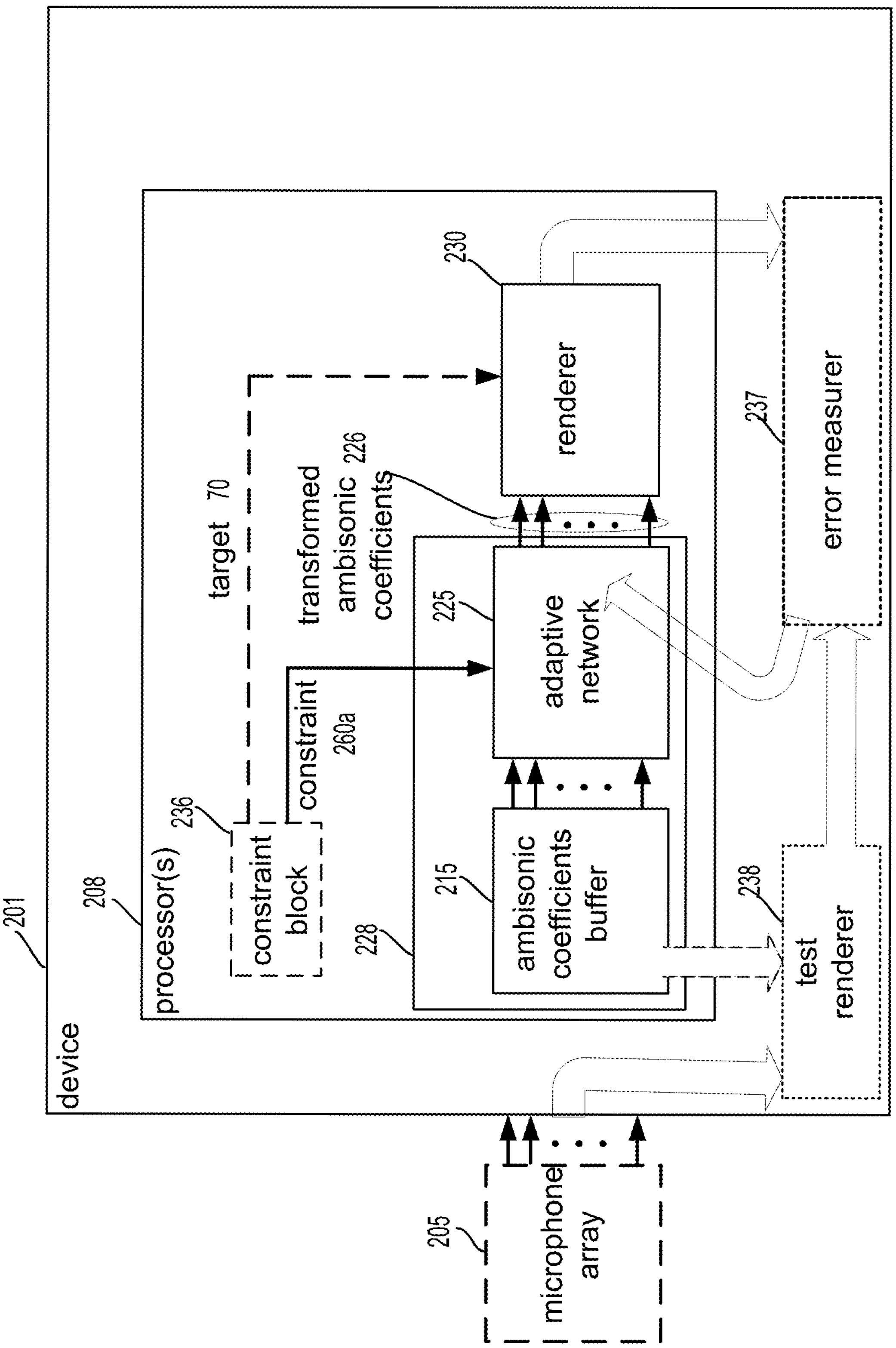
FIG. 2A is a diagram of a particular illustrative example of a system operable to perform adaptive learning of weights of an adaptive network with a constraint and target ambisonic coefficients in accordance with some examples of the present disclosure.

Referring to FIG. 2A, a particular illustrative example of a system operable to perform adaptive learning of weights of an adaptive network 225 with a constraint 260 and target ambisonic coefficients 70, in accordance with some examples of the present disclosure is illustrated. In the example illustrated in FIG. 2A, processor(s) 208 includes an adaptive network 225, to perform the signal processing on the ambisonic coefficients that are stored in the ambisonic coefficients buffer 215. The ambisonic coefficients in the ambisonic coefficients buffer 215, may also be included in the processor(s) 208 in some implementations. In other implementations, the ambisonic coefficients buffer may be located outside of the processor(s) 208 or may be located on another device (not illustrated). The ambisonic coefficients in the ambisonic coefficients buffer 215 may be transformed by the adaptive network 225 via the inference stage after learning the weights of the adaptive network 225, resulting in transformed ambisonic coefficients 226. The adaptive network 225 and ambisonic coefficients buffer 215 may be coupled together to form an ambisonic coefficient adaptive transformer 228.

In one embodiment, the adaptive network 225 may use a contextual input, e.g., a constraint 260 and target ambisonic coefficients 70 output of a constraint block 236 may aid the adaptive network 225 to adapt its weights such that the untransformed ambisonic coefficients become transformed ambisonic coefficients 226 after the weights of the adaptive network 225 have converged. It should be understood that using the ambisonic coefficients buffer 215 may store ambisonic coefficients that were captured with a microphone array 205 directly, or that were derived depending on the type of the microphone array 205. The ambisonic coefficients buffer 215 may also store synthesized ambisonic coefficients, or ambisonic coefficients that were converted from a multi-channel audio signal that was either in a channel audio format or object audio format. Moreover, once the adaptive network 225 has been trained and the weights of the adaptive network 225 have converged the constraint block 260 may be optionally located within the processor(s) 208 for continued adaptation or learning of the weights of the device 201. In a different embodiment, the constraint block 236 may no longer required once the weights have converged. Including the constraint block 236 once the weights are trained may take up unnecessary space, thus it may be optionally included in the device 201. In another embodiment, the constraint block 236 may be included on a server (not shown) and processed offline and the converged weights of the adaptive network 225 may be updated after the device 201 has been operating, e.g., the weights may be updated over-the-air wirelessly.

The renderer 230 which may also be included in the processor(s) 208 may render the transformed ambisonic coefficients output by the adaptive network 225. The renderer 230 output may be provided to an error measurer 237. The error measurer 237 may be optionally located in the device 201. Alternatively, the error measurer 237 may be located outside of the device 201. In one embodiment, the error measurer 237 whether located on the device 201 or outside the device 201 may be configured to compare a multi-channel audio signal with the rendered transformed ambisonic coefficients.

In addition, or alternatively, there may be a test renderer 238 optionally included in the device 201, or in some implementations outside of device 201 (not illustrated), where the test renderer renders ambisonic coefficients that may be optionally output form the microphone array 205. In other implementations, the untransformed ambisonic coefficients that are stored in the ambisonic coefficients buffer 215 may be rendered by the test renderer 238 and the output may be sent to the error measure 237.

In another embodiment, neither the test renderer 238, nor the renderer 230 outputs are sent to the error measurer 237, rather the untransformed ambisonic coefficients are compared with a version of the transformed ambisonic coefficients 226 where the weights of the adaptive network 225 have not yet converged. That is to say, the error between the transformed ambisonic coefficients 226 and the untransformed ambisonic coefficients is such that the transformed ambisonic coefficients 226 for the constraint that includes the target ambisonic coefficient is still outside of an acceptable error threshold, i.e., not stable.

The error between the untransformed ambisonic coefficients and the transformed coefficients 226 may be used to update the weights of the adaptive network 225, such that future versions of the transformed ambisonic coefficients 226 are closer to a final version of transformed ambisonic coefficients. Over time, as different input audio sources are presented at different directions, and/or sound levels are used to train the adaptive network 225 the error between the untransformed ambisonic coefficients and versions of the transformed coefficients becomes smaller, until the weights of the adaptive network 225 converge when the error between the untransformed ambisonic coefficients and transformed ambisonic coefficients 226 is stable.

If the error measurer 237 is comparing rendered untransformed ambisonic coefficients and rendered versions of the transformed ambisonic coefficients 226 the process described is the same, except in a different domain. For example, the error between the rendered untransformed ambisonic coefficients and the rendered transformed coefficients may be used to update the weights of the adaptive network 225, such that future versions of the rendered transformed ambisonic coefficients they are closer to a final version of rendered transformed ambisonic coefficients. Over time, as different input audio sources are presented at different directions and/or sound levels are used to train the adaptive network 225 the error between the rendered untransformed ambisonic coefficients and versions of the rendered transformed coefficients becomes smaller, until the weights of the adaptive network 225 converge when the error between the rendered untransformed ambisonic coefficients and rendered transformed coefficients is stable.

The constraint block 236 may include different blocks. Example of which type of different blocks may be included in the constraint block 236 are described herein.

Figure 2B:
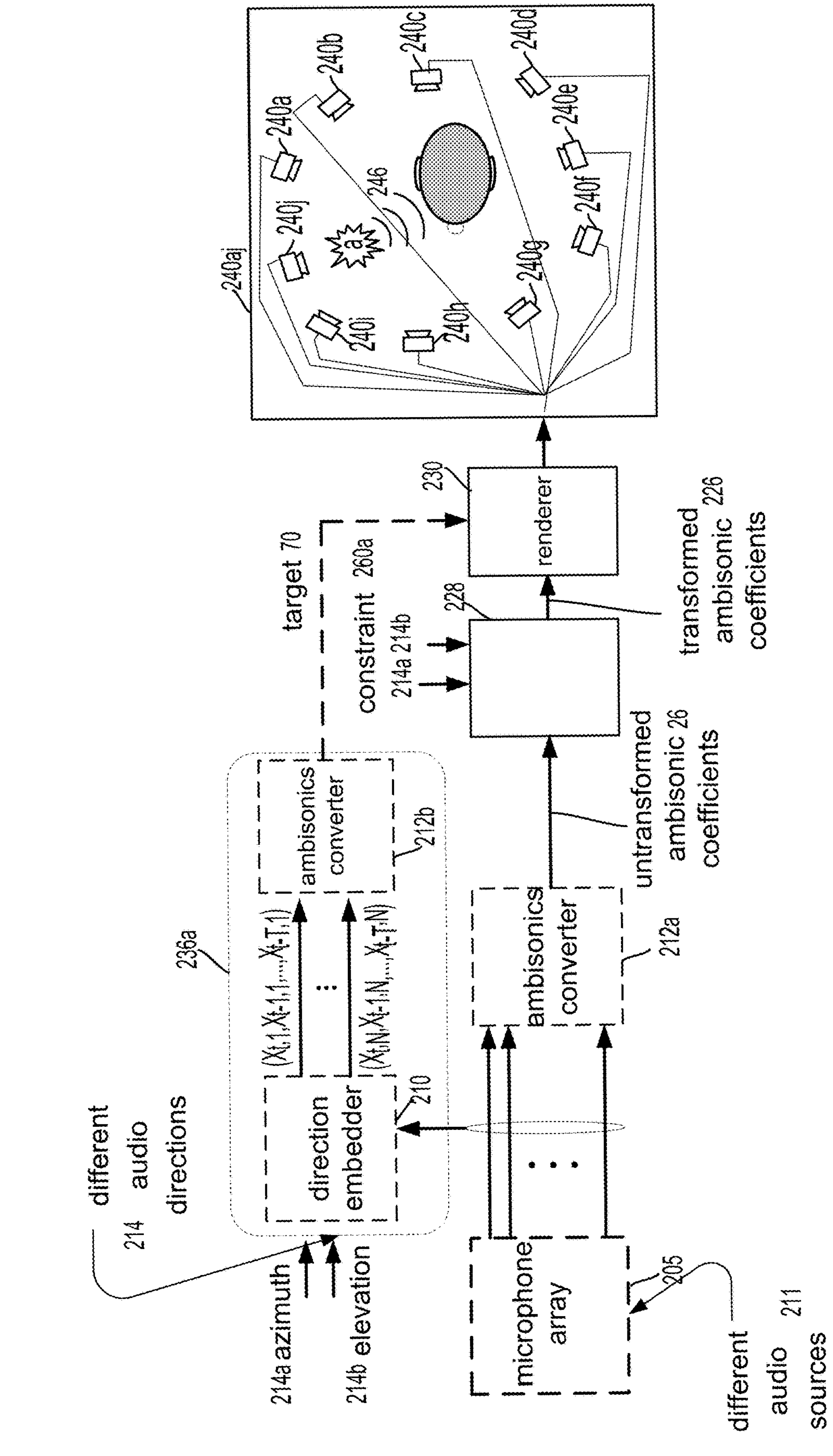
FIG. 2B is a diagram of a particular illustrative example of a system operable to perform an inference and/or adaptive learning of weights of an adaptive network with a constraint and target ambisonic coefficients, wherein the constraint includes using a direction, in accordance with some examples of the present disclosure.

Referring to FIG. 2B, a particular illustrative example of a system operable to perform an inference and/or adaptive learning of weights of an adaptive network with a constraint and target ambisonic coefficients, wherein a constraint includes a direction, in accordance with some examples of the present disclosure, is illustrated. A direction may be represented in a three-dimensional coordinate system with an azimuth angle and elevation angle.

In an embodiment, a multi-channel audio signal may be output by the microphone array 205 or synthesized previously (e.g., a song that is stored or audio recording that is created by a content creator, or user of the device 201) that includes a first audio source at a fixed angle. The multi-channel audio signal may include more than one audio source, i.e., there may be a first audio source, a second audio source, a third audio source, or additional audio sources. The different audio sources 211 which may include the first audio source, the second audio source, the third audio source, or additional audio sources may be placed at different audio directions 214 during the training of the adaptive network 225. The input into the adaptive network 225 may include untransformed ambisonic coefficients which may directly output from the microphone array 205 or may be synthesized by a content creator prior to training, e.g., a song or recording may be stored in an ambisonics format and the untransformed ambisonic coefficients may be stored or derived from the ambisonics format. The untransformed ambisonic coefficients may also be output of an ambisonics converter 212*a* coupled to the microphone array 205 if the microphone array does not necessarily output the untransformed ambisonic coefficients.

As discussed above, the adaptive network 225 may also have as an input a target or desired set of ambisonic coefficients that is included with the constraint 260, e.g., the constraint 260*a*. The target or desired set of ambisonic coefficients may be generated with an ambisonics converter 212*a* in the constraint block 236*b*. The target or desired set of ambisonic coefficients may also be stored in a memory (e.g., in another part of the ambisonic coefficients buffer or in a different memory). Alternatively, specific directions and audio sources may be captured by the microphone array 205 or synthesized, and the adaptive network 225 may be limited to learning weights that perform spatially filtering for those specific directions.

Moreover, the constraint 260*a* may include a label that represents the constraint 260*a* or is associated with the constraint 260*a*. For example, if the adaptive network 225 is being trained with the direction 60 degrees, there may be a value of 60, or a range of values where 60 lies. For example, if the resolution of the spatial constraint is 10 degrees apart (360/10)=36 range of values may be represented. If the spatial constraint is 5 degrees apparat (360/5)=72 range of values may be represented. Thus, a label may be the binary value of where 60 lies in the range of values. For example, if 0 to 9 degrees is the $0^{th}$ value range when the resolution is 10 degrees, then 60 lies in the 6th value range which spans 60-69 degrees. For this case, the label may be represented by the binary value of 6=000110. In another example, if 0 to 4 degrees is the $0^{th}$ value range when the resolution is 5 degrees, then 60 lies in the $13^{th}$ value range which spans 60-64 degrees. For this case, the label may have the binary value of 13=0001101. If there are two angles (e.g., where the direction is represented in a three-dimensional coordinate system), the label may concatenate the two angles to the untransformed ambisonic coefficients. The resolution of the angles learned does not necessarily have to be the same. For example, one angle (i.e., the elevation angle) may have a resolution of 10 degrees, and the other angle (i.e., the azimuth angle) may have a resolution of 5 degrees. The label may be associated with the target or desired ambisonic coefficients. The label may be a fixed number that may serve as an input during the training and/or inference operation of the adaptive network 225 to output transformed ambisonic coefficients 226 when the adaptive network 225 receives the untransformed coefficients from the ambisonic coefficients buffer 215.

In an illustrative example, the adaptive network 225 initially adapts its weights to perform a task based on a constraint (e.g., the constraint 260*a*). The task includes preserving the direction (e.g., angles) 246 of an audio source (e.g., a first audio source). The adaptive network 225 has a target direction (e.g., an angle) within some range, e.g., 5-30 degrees from an origin of a coordinate system.

The coordinate system may be with respect to a room, a corner or center of the room may serve as the origin of the coordinate system. In addition, or alternatively, the coordinate system may be with respect to the microphone array 205 (if there is one, or where it may be located). Alternatively, the coordinate system may be with respect to the device 201. In addition, or alternatively, the coordinate system may be with respect to a user of the device (e.g., there may a wireless link between the device 201 and another device (e.g., a headset worn by the user) or cameras or sensors located on the device 201 to locate where the user is relative to the device 201. In an embodiment, the user may be wearing the device 201 if for example the device 201 is a headset (e.g., a virtual reality headset, augmented reality headset, audio headset, or glasses). In a different embodiment, the device 201 may be integrated into part of a vehicle and the location of the user in the vehicle may be used as the origin of the coordinate system. Alternatively, a different point in the vehicle may also serve as the origin of the coordinate system. In each of these examples, the first audio source "a" may be located at a specific angle, which is also represented as a direction relative to a fixed point such as the origin of the coordinate system.

In one example, the task to preserve the direction 246 of the first audio source, spatially filters out other audio sources (e.g., the second audio source, the third audio source and/or additional audio sources) or noise outside of the target direction within some range, e.g., 5-30 degrees. As such, if the first audio source is located at a fixed direction of 60 degrees, then the adaptive network 225 may filter out audio sources and/or noise outside of 60 degrees+/−2.5 degrees to 15 degrees, i.e., [45-57.5 degrees to 62.5-75 degrees]. Thus, the error measurer 237 may produce an error that is minimized until the output of the adaptive network 225 are transformed ambisonic coefficients 226 that represent a soundfield that includes the target signal of a first audio source "a" located at a fixed angle (e.g., 15 degrees, 45 degrees, 60 degrees, or any degree between 0 and 360 degrees in a coordinate system relative to at least one fixed axis).

In a three-dimensional coordinate system, there may be two fixed angles (sometimes referred to as an elevation angle and an azimuth angle) where one angle is relative to the x-z plane in a reference coordinate system (e.g., the x-z plane of the device 201, or a side of the room, or side of the vehicle, or the microphone array 205), and the other axis is in the z-y plane of a reference coordinate system (e.g., the y-z plane of the device 201, or a side of the room, or side of the vehicle, or the microphone array 205). What side is called the x-axis, y-axis, and z-axis may vary depending on an application. However, one example is to consider the center of a microphone array and an audio source traveling directly in front of the microphone array towards the center may be considered to be coming from a y-direction in the x-y plane. If the audio source is arriving from the top (however that is defined) of the microphone array the top may be considered the z-direction, and the audio source may be in the x-z plane.

In some implementations, the microphone array 205 is optionally included in the device 201. In other implementations, the microphone array 205 is not used to generate the multi-channel audio signal that is converted into the untransformed ambisonic coefficients in real-time. It is possible for a file, (e.g., a song that is stored or audio recording that is created by a content creator, or user of the device 201) to be converted into the untransformed ambisonic coefficients 26.

Multiple target signals may be filtered at once by the adaptive network 225. For example, the adaptive network 225 may filter a second audio source "b" located at a different fixed angle, and/or a third audio source "c" located at a third fixed angle. Though reference is made to a fixed angle, a person having ordinary skill in the art understands that the fixed angle may be representing both an azimuth angle and an elevation angle in a three-dimensional coordinate system. Thus, the adaptive network 225 may perform the task of spatial filtering at multiple fixed directions (e.g., direction 1, direction 2, and/or direction 3) once the adaptive network 225 has adapted its weights to learn how to perform the task of spatial filtering. For each target signal, the error measurer 237 produces an error between the target signal (e.g., the target or desired ambisonic coefficients 70 or an audio signal where the target or desired ambisonic coefficients 70 may be derived from) and the rendered transformed ambisonic coefficients. Like the error measurer 237, a test renderer 238 may optionally be located inside of the device 201 or outside of the device 201. Moreover, the test renderer 238 may optionally render the untransformed ambisonic coefficients or may pass through the multi-channel audio signal into the error measurer 237. The untransformed ambisonic coefficients may represent a soundfield that include the first audio source, the second audio source, the third audio source, or even more audio sources and/or noise. As such, the target signal may include more than one audio source.

For example, during inferencing, the adaptive network 225 may use the learned or converged a set of weights that allows the adaptive network 225 to spatially filter out sounds from all directions except desired directions. Such an application may include where the sound sources are at relatively fixed positions. For example, the sound sources may be where one or more persons are located (within a tolerance, e.g., of a 5-30 degrees) at fixed positions in a room or vehicle.

In another example, during inferencing, the adaptive network 225 may use the learned or converged set of weights to preserve audio from certain directions or angles and spatially filter out other audio sources and/or noise that are located at other directions or angles. In addition, or alternatively, the reverberation associated with the target audio source or direction being preserved may also be used as part of the constraint 260*a*. In a system of loudspeakers 240*aj*, the first audio source a t the preservation direction 246 may be heard by a user, after the transformed ambisonic coefficients 226 are rendered by the renderer 230 and used by the loudspeaker(s) 240*aj* to play the resulting audio signal.

Other examples may include preserving the direction of one audio source at different audio directions than what is illustrated in FIG. 2B. In addition, or alternatively, examples may include preserving the direction of more than one audio source at different audio directions. For example, audio sources at 10 degrees (+/−a 5-30 degree range) and 80 degrees (+/−5-30 degree range) may be preserved. In addition, or alternatively, the range of possible audio directions that may be preserved may include the directions of 15 to 165 degrees, e.g., any angle within most of the front part of a microphone array or the front of a device, where the front includes angles 15 to 165 degrees, or in some use cases a larger angular range (e.g., 0 to 180 degrees).

Figure 2C:
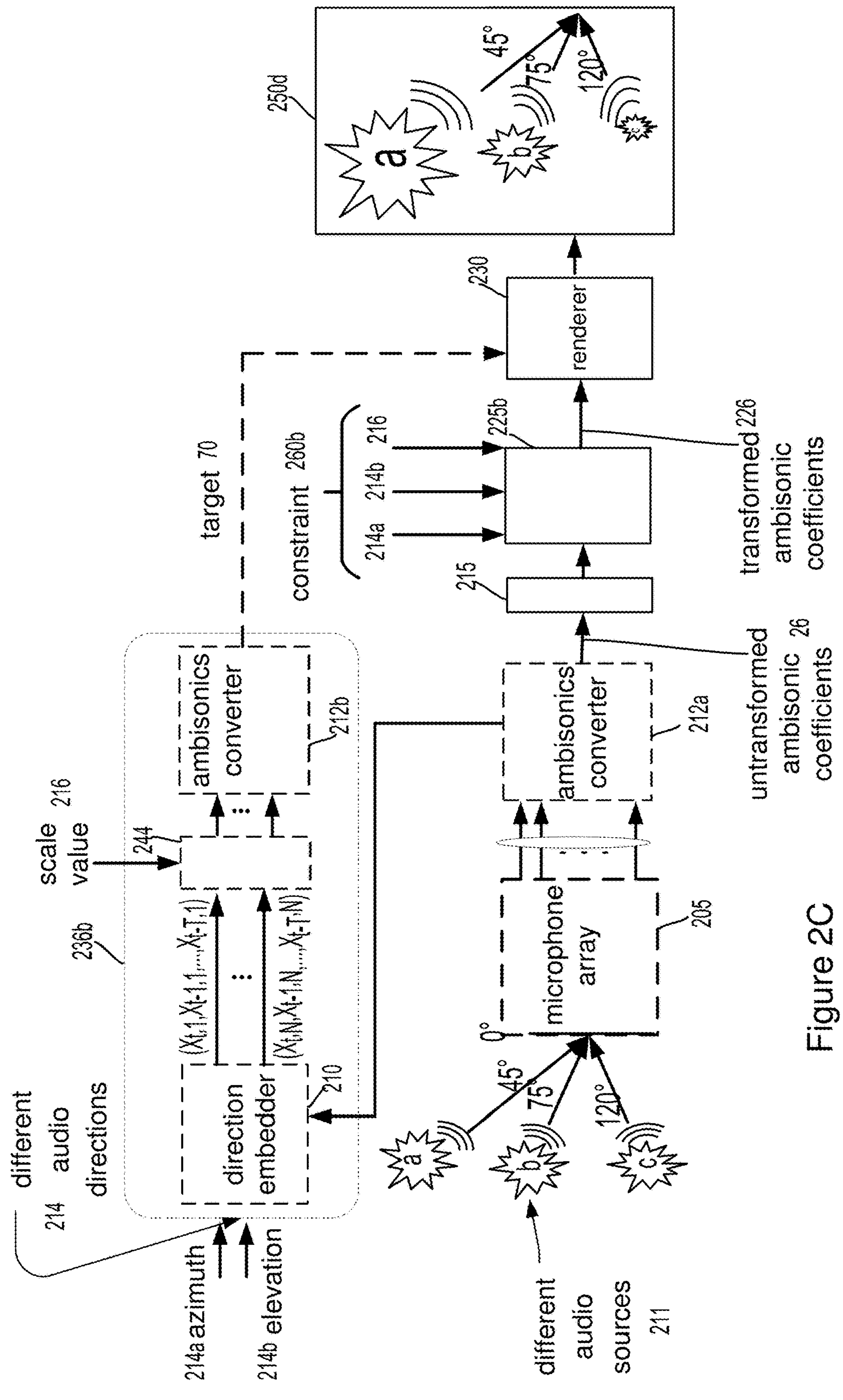
FIG. 2C is a diagram of a particular illustrative example of a system operable to perform an inference and/or adaptive learning of weights of an adaptive network with a constraint and target ambisonic coefficients, wherein the constraint includes using a scaled value, in accordance with some examples of the present disclosure.

Referring to FIG. 2C, a particular illustrative example of a system operable to perform an inference and/or adaptive learning of weights of an adaptive network with a constraint, wherein a constraint and target ambisonic coefficients 70 based on using a soundfield scaler in accordance with some examples of the present disclosure is illustrated. Portions of the description of FIG. 2C are similar to that of the description of FIG. 2A and FIG. 2B, except the certain portions that are associated with the constraint block 236*a* of FIG. 2B that included a direction embedder 210 are replaced with certain portions that are associated with the constraint block 236*b* of FIG. 2C that includes a soundfield scaler 244.

In the illustrative example of FIG. 2C, audio sources "a" (e.g., is a first audio source), "b" (e.g., is a second audio source), and "c" (e.g., is a third audio source) are located at different audio directions, 45 degrees, 75 degrees and 120 degrees, respectively. The audio directions are shown with respect to the origin (0 degrees) of a coordinate system that is associated with the microphone array 205. However, as described above, the origin of the coordinate system may be associated with different portions of the microphone array, room, in-cabin location of a vehicle, device 201, etc. The first audio source "a", the second audio source "b", the third audio source "c" may be in a set of different audio sources 211 that are used during the training of the adaptive network 225*b*.

In addition to the different audio directions 214 and different audio sources 211, different scale values 216 may be varied for each different audio direction of the different audio directions 214 and each different audio source of the different audio sources 211. The different scale values 216 may amplify or attenuate the untransformed ambisonic coefficients that represent the different audio sources 211 input into the adaptive network 225*b*.

Other examples may include rotating untransformed ambisonic coefficients that represent an audio source at different audio angles prior to training or after training than what is illustrated in FIG. 2C. In addition, specific directions and audio sources may be captured by the microphone array 205 or synthesized, and the adaptive network 225*b* may be limited to learning weights that perform spatially filtering and rotation for those specific directions.

In addition, in another embodiment, the direction embedder may be omitted and the soundfield may be scaled with the scale value 216. In such a case, it may also be possible to scale the entire soundfield directly in the ambisonics domain and having the soundfield scaler 244 operate directly on the ambisonic coefficients prior to being stored in the ambisonics coefficients buffer 215.

As an example, the soundfield scaler 244 may individually scale representation of untransformed ambisonic coefficients 26 of audio sources, e.g., the first audio source may be scaled by a positive or negative scale value 216*a* while the second audio source may not have been scaled by any scale value 216 at all. In such cases, the untransformed ambisonic coefficients 26 that represent a second audio source from a specific direction may have been input to the adaptive network 225*b* where there is no scale value 216*a*, or the untransformed ambisonic coefficients 26 that represent the second audio source from a specific direction input into the adaptive network 225*b* may have bypassed the soundfield scaler 244 (i.e., were not presented to the soundfield scaler 244).

Moreover, the constraint 260*b* may include a label that represents the constraint 260*b* or is associated with the constraint 260*b*. For example, if the adaptive network 225 is being trained with the azimuth angle 214*a*, elevation angle 214*b*, or both, and a scale value 216, the scale value may be concatenated to the untransformed ambisonic coefficients. Using the examples associated with FIG. 2B for the azimuth angle 214*a* and elevation angle 214*b*, a representation of the scale value 216 may be concatenated before the elevation angles 214*a*, 214*b* or after the elevation angles 214*a*, 214*b*. The scale value 216 may also be normalized. For example, suppose the unnormalized scale value 216 varied from −5 to +5, the normalized scale value may vary from −1 to 1 or 0 to 1. The scale value 16 may be represented by different scale values, e.g., at different scaling value resolutions, and different resolution step sizes. Suppose that every 0.01 values, the scale value 216 varied. That would represent 100 different scale values and may be represented by a 7-bit number. As an example, the scale value of 0.17 may be represented by the binary number 18, that is the $18^{th}$ resolution step size of 0.01. As another example, suppose the resolution step size was 0.05, then the value of 0.17 may be represented by the binary number 3, as 0.17 is closest to the $4^{th}$ step size (0.15) for the different scaling value resolution, i.e., 0=00000, 0.05=00001, 0.1=00010, 0.15=00011. Thus, the label may include the, as an example, binary values for the azimuth angle 214*a*, elevation angle 214*b*, and scale value 216.

Figure 2D:
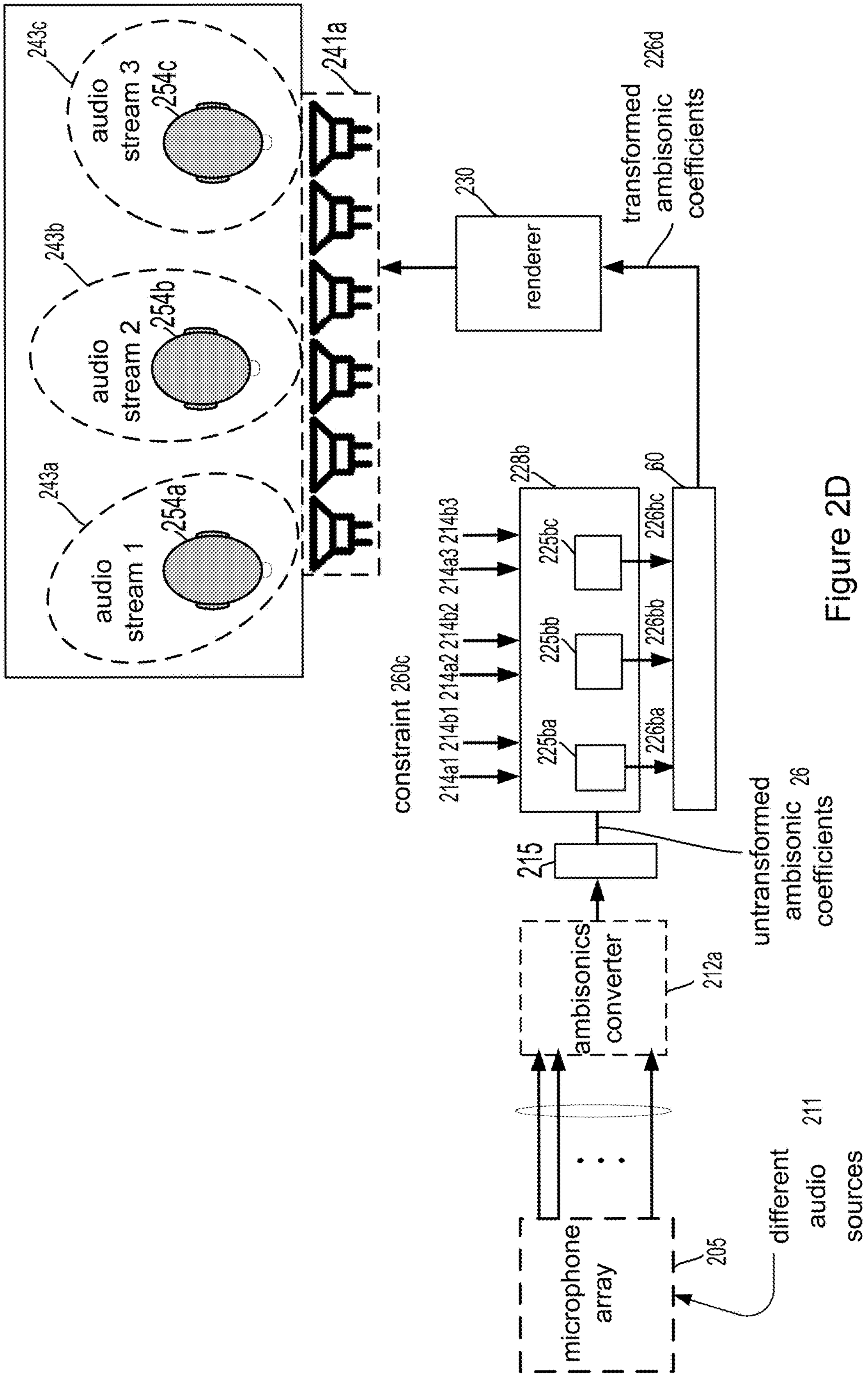
FIG. 2D is a diagram of a particular illustrative example of a system operable to perform an inference and/or inferencing of an adaptive network with multiple constraints and target ambisonic coefficients, wherein the multiple constraints includes using multiple directions, in accordance with some examples of the present disclosure.

Referring to FIG. 2D, a particular illustrative example of a system operable to perform an inference and/or inferencing of an adaptive network with multiple constraints and target ambisonic coefficients, wherein the multiple constraints includes using multiple directions, in accordance with some examples of the present disclosure. Portions of the description of FIG. 2D, relating to the inference stage associated with FIG. 2B and/or FIG. 2C are applicable.

In FIG. 2D, there are multiple adaptive networks 225*a*, 225*b*, 225*c* configured to operate with different constraints 260*c*. In an embodiment, the output of multiple adaptive networks 225*a*, 225*b*, 225*c* may be combined with a combiner 60. The combiner 60 may be configured to linearly add the individual transformed ambisonic coefficients 226*da*, 226*db*, 226*dc* that is respectively output by each adaptive network 225*a*, 226*b*, 225*c*. Thus, the transformed ambisonic coefficients 226*d* may represent a linear combination of the individual transformed ambisonic coefficients 226*da*, 226*db*, 226*dc*. The transformed ambisonic coefficients 226*d* may be rendered by a renderer 240 and provided to one or more loudspeakers 241*a*. The output of the one or more loudspeakers 241*a* may be three audio streams. The first audio stream 1 243*a* may be played by the one or more loudspeakers 241*a* as if emanating from a first direction, 214*a*1 214*b*1. The second audio stream 2 243*b* may be played by the one or more loudspeakers 241*a* as if emanating from a second direction, 214*a*2 214*b*2. The third audio stream 3 243c may be played by the one or more loudspeakers 241*a* as if emanating from a second direction, 214*a*3 214*b*3. A person of ordinary skill in the art will recognize that the first, second, and third audio streams may interchangeably be called the first, second and third audio sources. That is to say, one audio stream may include 3 audio sources 243*a*, 243*b* 243*c* or there may be three separate audio streams 243*a* 243*b* 243*c* that are heard as emanating from three different directions: direction 1 (azimuth angle 214*a*1, elevation angle 214*b*1); direction 2 (azimuth angle 214*a*2, elevation angle 214*b*2); direction 3 (azimuth angle 214*a*3, elevation angle 214*b*3). Each audio stream or audio source may be heard by a different person located more closely to the direction where the one or more loudspeakers 241*a* are directing the audio sources to. For example, a first person 254*a* may be positioned to better hear the first audio stream or audio source 214*a*1. The second person 254*b* may be positioned to better hear the second audio stream or audio source 214$a$2. The third person 25$cb$ may be positioned to better hear the third audio stream or audio source 214$a$3.

Figure 2E:
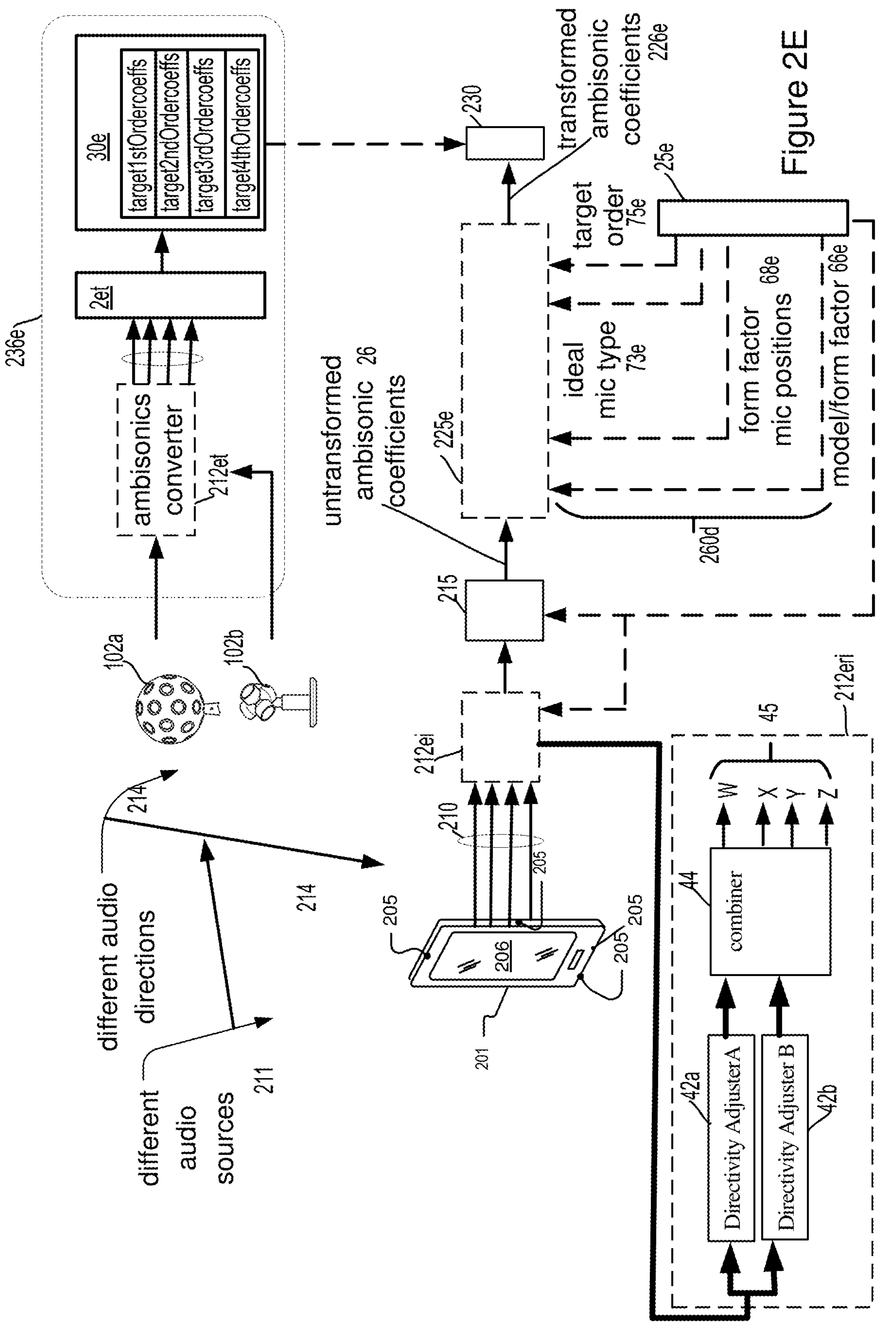
FIG. 2E is a diagram of a particular illustrative example of a system operable to perform an inference and/or inferencing and/or adaptive learning of weights of an adaptive network with a constraint and target ambisonic coefficients, wherein the constraint includes at least one of ideal microphone type, target order, form factor microphone positions, model/form factor, in accordance with some examples of the present disclosure.

Referring to FIG. 2E, a particular illustrative example of a system operable to perform an inference and/or inferencing and/or adaptive learning of weights of an adaptive network with a constraint and target ambisonic coefficients, wherein the constraint includes at least one of ideal microphone type, target order, form factor microphone positions, model/form factor, in accordance with some examples of the present disclosure.

In FIG. 2E, an ideal microphone type, such as a microphone array 102*a* that may have 32 microphones located around points of a sphere, or a microphone array 102*b* that has a tetrahedral shape which includes four microphones are shown, which serve as examples of ideal microphone types. During training, different audio directions 214 and different audio sources may be used as inputs captured by these microphone arrays 102*a*, 102*b*. For the case of the tetrahedral microphone array 102*b*, the output of is a collection of sound pressures, from each microphone, that may be decomposed into its spherical coefficients and may be represented with the notation (W, X, Y, Z) are ambisonic coefficients. In the case of the spherical microphone array 102*a*, the output of is also a collection of sound pressures, from each microphone, that may be decomposed into its spherical coefficients.

In general, for microphone arrays, the number of microphones used to determine the minimum ambisonic coefficients for a given set of microphones is governed by taking the ambisonic order adding one and then squaring. For example, for a fourth order ambisonic signal with 25 coefficients, the minimum number of output microphone outputs is 25, $M=(N+1)^2$, where N=ambisonic order. Using this formulation provides a minimum directional sampling scheme, such that the math operations to determine the ambisonic coefficients are based on a square inversion of the spherical basis functions times the sound pressure for the collective microphones from the microphone array 102*b*. Thus, for an ideal microphone array 102*b* output the ambisonics converter 212*dt* converts the sound pressures of the microphones into ambisonics coefficients as explained above. Other operations may be used in an ambisonics coefficients for non-ideal microphone arrays to convert the sound pressures of the microphones into ambisonic coefficients.

During the training phase of the adaptive network 225*e*, a controller 25*et* in the constraint block 236*e*, may store one or more target ambisonic coefficients in an ambisonics buffer 30*e*. For example, as shown in FIG. 2E, the ambisonics coefficients buffer 30*d* may store a first order target ambisonics coefficients, which may be output out of either the tetrahedral microphone array 102*a* or after the ambisonics converter 212*et* converts the output of the microphone array 102*b* to ambisonics coefficients. The controller 25*et* may provide different orders during training to the ambiosnics coefficients buffer 30*e*.

During the training phase of the adaptive network 225*e*, a device 201 (e.g., a handset, or headset) may include a plurality of microphones (e.g., four) that capture the difference audio sources 211 and different audio directions 214 that the ideal microphones 102*a*, 102*b*. In an embodiment, the different audio sources 211 and different audio directions 214 are the same as presented to the ideal microphones 102*a*, 102*b*. In a different embodiment, the different audio sources 211 and different audio directions may be synthesized or simulated as if they were captured in real-time. In either case, in the example where the device 201 includes four microphones, the microphone outputs 210 may be converted to untransformed ambisonic coefficients 26, by an ambisonics converter 212*di*, and the untransformed ambisonic coefficients 26 may be stored in an ambisonics coefficient buffer 215.

During the training phase of the adaptive network 225*e*, a controller 25*e* may provide one or more constraints 260*d* to the adaptive network 225*e*. For example, the controller 25*e* may provide the constraint of target order to the adaptive network 225*e*. In an embodiment, the output of the adaptive network 225*e* includes an estimate of the transformed ambisonic coefficients 226 being at the desired target order 75*e* of the ambisonic coefficients. As the weights of the of the adaptive network 225*e* learned how to produce an output form the adaptive network 225*e* that estimates the target order 75*e* of the ambisonic coefficients for different audio directions 214 and different audio sources 211. Different target orders may then be used during training of the weights until the weights of the adaptive network 225*e* have converged.

In a different embodiment, additional constraints may be presented to the adaptive network 225*e* while the different target orders are presented. For example, the constraint of an ideal microphone type 73*e* may also be used during the training phase to the adaptive network 225*e*. The constraints may be added as labels that are concatenated to the untransformed ambisonic coefficients 26. For example, the different orders may be represented by a 3 bit number to represent orders 0 . . . 7. The ideal microphone types may be represented by a binary number to represent a tetrahedral microphone array 102*b* or a spherical microphone array 102*a*. The form factor microphone positions may also be added as a constraint. For example, a handset may be represented has having a number of sides: e.g., a top side, a bottom side, a front side, a rear side, a left side, and a right side. In other embodiments, the handset may also have an orientation (its own azimuth angle and elevation angle). The location of a microphone may be placed at a distance from a reference point on one of these sides. The locations of the microphones and each side, along with the orientation, and form factor may be added as the constraints. As an example, the sides may be represented with a 6 digits {1, 2, 3, 4, 5, 6}. The location of the microphones may be represented as a 4 digit binary number representing 32 digits {1 . . . 31}, which may represent a distance in centimeters. The form factor may also be used to differentiate between, handset, tablet, laptop, etc. Other examples may also be used depending on the design.

In an embodiment, it is also possible to recognize that the untransformed ambisonic coefficients may also be synthesized and stored in the ambisonics coefficient buffer 215, instead of being captured by a non-ideal microphone array.

In a particular embodiment, the adaptive network 225*e*, may be trained to learn how to correct for a directivity adjustment error. As an example, a device 201 (e.g., a handset) may include a microphone array 205, as shown in FIG. 2E. For illustrative purposes, the microphone outputs 210 are provided to two directivity adjusters (directivity adjuster A 42*a*, directivity adjuster B 42*b*). The directivity adjusters and combiner 44 convert the microphone outputs 210 into ambisonic coefficients. As such, one configuration of the ambisonics converter 212*eri* may include the directivity adjusters 42*a*, 42*b*, and the combiner 44. The outputs W X YZ 45 are first order ambisonic coefficients. However, using such architecture for an ambisonics converter 212*eri* may introduce biasing errors when an audio source is coming from certain azimuth angles or elevation angles. By presenting the target first order ambisonic coefficients to the renderer 230 and using the output to update the weights of the adaptive network 225*e*, or by directly comparing the target first order ambisonics coefficients with the outputs W X Y Z 45, the weights of the adaptive network 225*e* may be updated and eventually converge to correct the biasing errors when an audio source is coming from certain azimuth angles or elevation angles. The biasing errors may appear at different temporal frequencies. For example, when an audio source is at 90 degree elevation angle, the first order ambisonic coefficients may represent the audio source in certain frequency bands (e.g., 0-3 kHz, 3 kHz-6 kHz, 6 kHz-9 kHz, 12 kHz-15 kHz, 18 kHz-21 kHz) accurately. However, in other frequency bands, 9 kHz-12 kHz, 15 kHz-18 kHz, 21 kHz-24 kHz) the audio source may appear to be skewed from where it should be.

During the inference stage, the microphone outputs 210 provided by the microphone array 205 included on the device 201 (e.g., a handset) may output the first order ambisonic coefficients W X Y Z 45. a different embodiment, the adaptive network 225 inherently provides the transformed ambisonic coefficients 226 corrects the first order ambisonic coefficients W X Y Z 45 biasing errors, as in certain configurations it may be desirable to limit the complexity of the adaptive network 225. For example, in the case of a headset with limited memory size or computational resources, an adaptive network 225 that is trained to perform one function, e.g., correct the first order ambisonic errors may be desirable.

In a different embodiment, the adaptive network 225 may have has a constraint 75*e* that the target order is a $1^{st}$ order. There may be an additional constraint 73*e* that the ideal microphone type is a handset. In addition, there may be additional constraints 68*e* on where the locations of each microphone and on what side of the handset the microphones in the microphone array 205 are located. The first order ambisonic coefficients W X Y Z 45 that include the biasing error when an audio source is coming from certain azimuth angles or elevation angles are provided to the adaptive network 225*ei*. The adaptive network 225*ei* corrects the first order ambisonic coefficients W X Y Z 45 biasing errors, and the transformed ambisonic coefficients 226 output represents the audio source's elevation angle and/or azimuth angle accurately across all temporal frequencies. In some embodiments, there may also be the constraint 66*e* of which is the model type or form factor.

In a different embodiment, the adaptive network 225 may have a constraint 75*e* to perform a directivity adjustment without introducing a biasing error. That is to say, the untransformed ambisonic coefficients are transformed into transformed ambisonic coefficients based on the constraint of adjusting the microphone signals captured by a non-ideal microphone array as if the microphone signals had been captured by microphones at different positions of an ideal microphone array.

In another embodiment, the controller 25*e* may selectively provide a subset of the transformed ambisonic coefficients 226*e* to the renderer 230. For example, the controller 25*e* may control which coefficients (e.g., $1^{st}$ order, $2^{nd}$ order, etc.) are output of the ambisonics converter 212*ei*. In addition, or alternatively, the controller 25*e* may selectively control which coefficients (e.g., $1^{st}$ order, $2^{nd}$ order, etc.) are stored in the ambisonics coefficients buffer 215. This may be desirable, for example, when a spherical 32 microphone array 102*a* provides up to a fourth order ambisonic coefficients (i.e., 25 coefficients). A subset of the ambisonics coefficients may be provided to the adaptive network 225. Third order ambisonic coefficients are a subset of the fourth order ambisonic coefficients. Second order ambisonic coefficients are a subset of the third order ambisonic coefficients and also the fourth order ambisonic coefficients. First order ambisonic coefficients are a subset of the second order ambisonic coefficients, third order ambisonic coefficients, and the fourth order ambisonic coefficients. In addition, the transformed ambisonic coefficients 226 may also be selectively provided to the renderer 230 in the same fashion (i.e., a subset of a higher order ambisonic coefficients) or in some cases a mixed order of ambisonic coefficients.

Figure 3A:
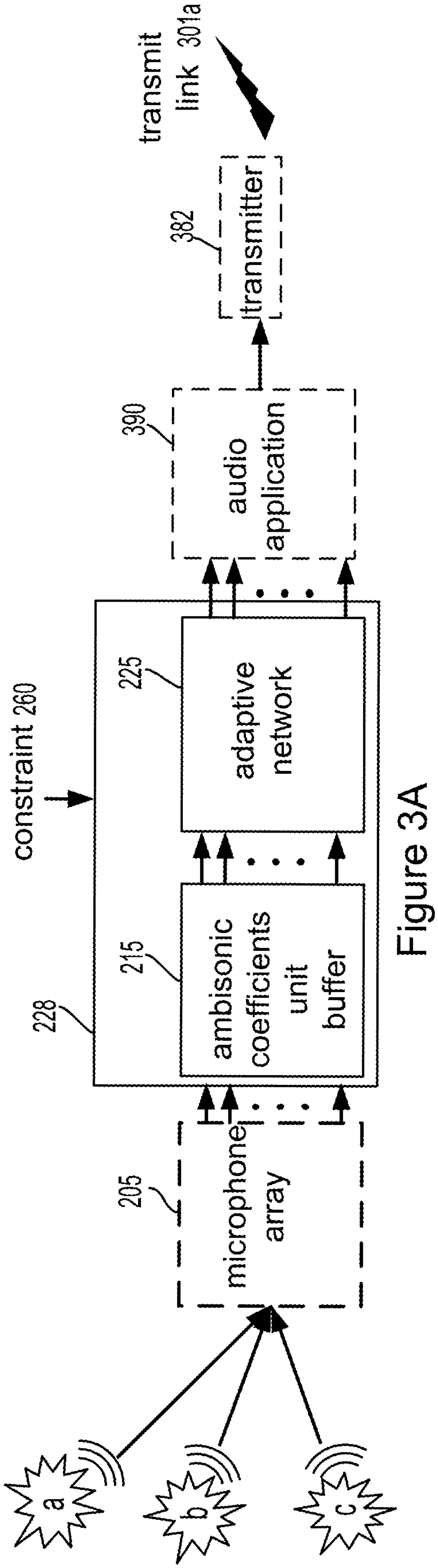
FIG. 3A is a block diagram of a particular illustrative aspect of a system operable to perform an inference of an adaptive network using learned weights in conjunction with one or more audio application(s), in accordance with some examples of the present disclosure.

Referring to FIG. 3A, a block diagram of a particular illustrative aspect of a system operable to perform an inference of an adaptive network using learned weights in conjunction with one or more audio application(s), in accordance with some examples of the present disclosure is illustrated. There may be a number of audio application(s) 390 that may be included a device 201 and used in conjunction with the techniques described above in association with FIGS. 2A-2E. The device 201 may be integrated into a number of form factors or device categories, e.g., as shown in FIGS. 5A-5D. The audio applications 392 may also be integrated into the devices shown in FIGS. 6A-6D. With some application(s) where the audio sources were either captured through the microphone array 205 or synthesized, the output of the audio application may be transmitted via a transmitter 382 over a wireless link 301*a* to another device as shown in FIG. 3A. Such application(s) 390 are illustrated in FIGS. 4A-4F.

Figure 3B:
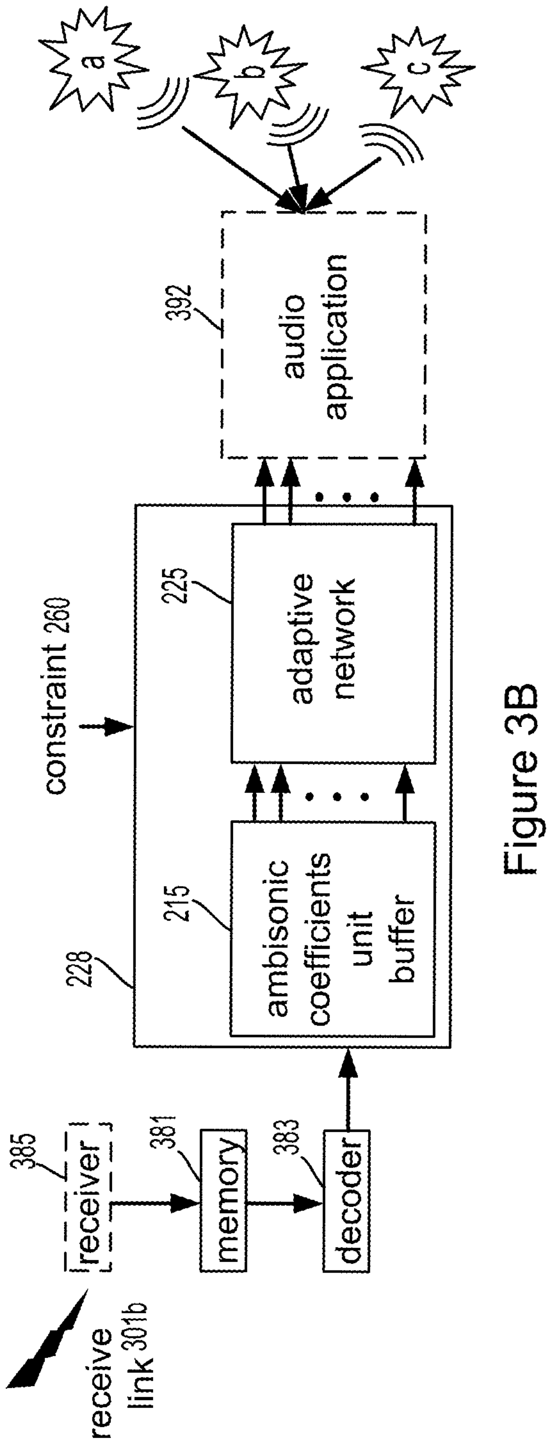
FIG. 3B is a block diagram of a particular illustrative aspect of a system operable to perform an inference of an adaptive network using learned weights in conjunction with one or more audio application(s), in accordance with some examples of the present disclosure.

Referring to FIG. 3B, a block diagram of a particular illustrative aspect of a system operable to perform an inference of an adaptive network using learned weights in conjunction with one or more audio application(s), in accordance with some examples of the present disclosure is illustrated. There may be a number of audio application(s) 392 that may be included a device 201 and used in conjunction with the techniques described above in association with FIGS. 2A-2E. The device 201 may be integrated into a number of form factors or device categories, e.g., as shown in FIGS. 5A-5D. The audio applications 392 may also be integrated into the devices shown in FIGS. 6A-6D, e.g., a vehicle. The transformed ambisonic coefficients 225 output of an adaptive network 225 shown in FIG. 3B may be provided to one or more audio application(s) 392 where the audio sources represented by untransformed ambisonic coefficients in an ambisonics coefficients buffer 215 may initially be received in a compressed form prior to being stored in the ambisonics coefficients buffer 215. For example, the compressed form of the untransformed ambisonic coefficients may be stored in a packet in memory 381 or received over a wireless link 301*b* via a receiver 385 and decompressed via a decoder 383 coupled to an ambisonics coefficient buffer 215 as shown in FIG. 3B. Such application(s) 392 are illustrated in FIGS. 4C-4F.

A device 201 may include different capabilities as described in association with FIGS. 2B-2E, and FIGS. 3A-3B. The device 201 may include a memory configured to store untransformed ambisonic coefficients at different time segments. The device 201 may also include one or more processors configured to obtain the untransformed ambisonic coefficients at the different time segments, where the untransformed ambisonic coefficients at the different time segments represent a soundfield at the different time segments. The one or more processors may be configured to apply at least one adaptive network 225*a*, 225*b*, 225*c*, 225*ba*, 225*bb*, 225*bc*, 225*e*, based on a constraint 260, 260*a*, 260*b*, 260*c*, 260*d*, and target ambisonic coefficients, to the untransformed ambisonic coefficients at the different time segments to generate transformed ambisonic coefficients 226, at the different time segments. The transformed ambisonic coefficients 226 at the different time segments may represent a modified soundfield at the different time segments, that was modified based on the constraint 260, 260*a*, 260*b*, 260*c*, 260*d*.

In addition, the transformed ambisonic coefficients 226 may be used by a first audio application that includes instructions that are executed by the one or more processors. Moreover, the device 201 may further include an ambisonic coefficients buffer 215 that is configured to store the untransformed ambisonic coefficients 26.

In some implementations, the device 201 may include a microphone a microphone array 205 that is coupled to the ambisonic coefficients buffer 215, configured to capture one or more audio sources that are represented by the untransformed ambisonic coefficients in the ambisonic coefficients buffer 215.

Figures 4A, 4B, 4C, 4D, 4E, 4F:
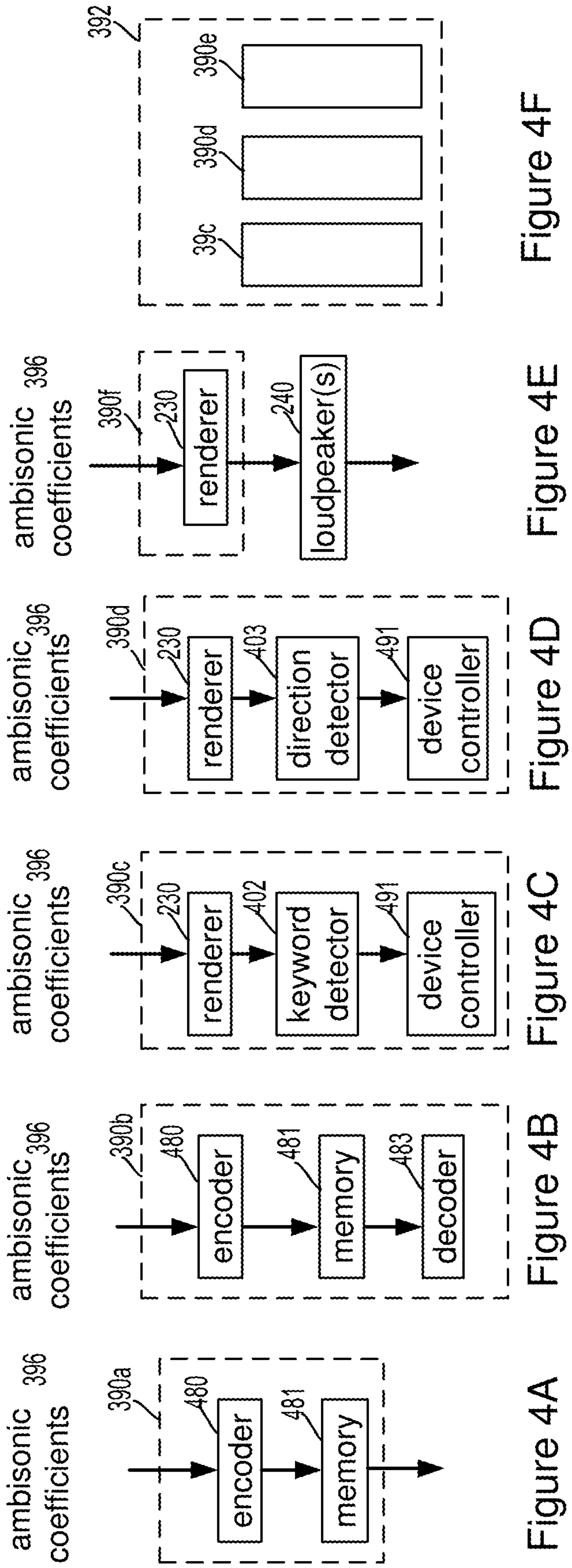
FIG. 4A is a block diagram of a particular illustrative aspect of a system operable to perform an inference of an adaptive network using learned weights in conjunction with an audio application, wherein an audio application uses an encoder and a memory in accordance with some examples of the present disclosure.
FIG. 4B is a block diagram of a particular illustrative aspect of a system operable to perform an inference of an adaptive network using learned weights in conjunction with an audio application, wherein an audio application includes use of an encoder, a memory, and a decoder in accordance with some examples of the present disclosure.
FIG. 4C is a block diagram of a particular illustrative aspect of a system operable to perform an inference of an adaptive network using learned weights in conjunction with an audio application, wherein an audio application includes use of a renderer, a keyword detector, and a device controller in accordance with some examples of the present disclosure.
FIG. 4D is a block diagram of a particular illustrative aspect of a system operable to perform an inference of an adaptive network using learned weights in conjunction with an audio application, wherein an audio application includes use of a renderer, a direction detector, and a device controller in accordance with some examples of the present disclosure.
FIG. 4E is a block diagram of a particular illustrative aspect of a system operable to perform an inference of an adaptive network using learned weights in conjunction with an audio application, wherein an audio application includes use of a renderer in accordance with some examples of the present disclosure.
FIG. 4F is a block diagram of a particular illustrative aspect of a system operable to perform an inference of an adaptive network using learned weights in conjunction with an audio application, wherein an audio application includes use of the applications described in FIGS. 4C, FIG. 4D, and FIG. 4E in accordance with some examples of the present disclosure.

Referring to FIG. 4A, a block diagram of a particular illustrative aspect of a system operable to perform an inference of an adaptive network using learned weights in conjunction with an audio application, wherein an audio application uses an encoder and a memory in accordance with some examples of the present disclosure is illustrated.

A device 201 may include the adaptive network 225, 225*g* and an audio application 390. In an embodiment, the first audio application 390*a*, may include instructions that are executed by the one or more processors. The first audio application 390*a* may include compressing the transformed ambisonic coefficients at the different time segments, with an encoder 480 and storing the compressed transformed ambisonic coefficients 226 to a memory 481. The compressed transformed ambisonic coefficients 226 may be transmitted, by a transmitter 482, over the transmit link 301*a*. The transmit link 301*a* may be a wireless link between the device 201 and a remote device.

FIG. 4B, a block diagram of a particular illustrative aspect of a system operable to perform an inference of an adaptive network using learned weights in conjunction with an audio application, wherein an audio application includes use of an encoder, a memory, and a decoder in accordance with some examples of the present disclosure is illustrated.

In FIG. 4B, the device 201 may include the adaptive network 225, 225*g* and an audio application 390. In an embodiment, a first audio application 390*b*, may include instructions that are executed by the one or more processors. The first audio application 390*b* may include compressing the transformed ambisonic coefficients at the different time segments, with an encoder 480 and storing the compressed transformed ambisonic coefficients 226 to a memory 481. The compressed transformed ambisonic coefficients 226 may be retrieved from the memory 481 with one or more of the processors and be decompressed by the decoder 483. One example of a the second audio application 390*b* may be a camcorder application, where audio is captured and may be compressed and stored for future playback. If a user goes back to see the video recording or if it was just an audio recording, the one or more processors which may include or be integrated with the decoder 483 may decompress the compressed transformed ambisonic coefficient at the different time segments.

Referring to FIG. 4C, a block diagram of a particular illustrative aspect of a system operable to perform an inference of an adaptive network using learned weights in conjunction with an audio application, wherein an audio application includes use of a renderer 230, a keyword detector 402, and a device controller 491 in accordance with some examples of the present disclosure is illustrated. In FIG. 4C, the device 201 may include the adaptive network 225, 225*g* and an audio application 390. In an embodiment, a first audio application 390*c*, may include instructions that are executed by the one or more processors. The first audio application 390*c* may include a renderer 230 that is configured to render the transformed ambisonic coefficients 226 at the different time segments. The first audio application 390*c* may further include a keyword detector 402, coupled to a device controller 491 that is configured to control the device based on the constraint. 260.

Referring to FIG. 4D, a block diagram of a particular illustrative aspect of a system operable to perform an inference of an adaptive network using learned weights in conjunction with an audio application, wherein an audio application includes use of a renderer 230, a direction detector 403, and a device controller 491 in accordance with some examples of the present disclosure is illustrated. In FIG. 4D, the device 201 may include the adaptive network 225 and an audio application 390. In an embodiment, a first audio application 390*c*, may include instructions that are executed by the one or more processors. The first audio application 390*c* may include a renderer 230 that is configured to render the transformed ambisonic coefficients 226 at the different time segments. The first audio application 390*c* may further include a direction detector 403, coupled to a device controller 491 that is configured to control the device based on the constraint 260.

It should be noted that in a different embodiment, the transformed ambisonic coefficients 226 may be output as having direction detection be part of the inference of the adaptive network 225. For example, in FIG. 2B, the transformed ambisonic coefficients 226 when rendered represent a soundfield where one or more audio sources may sound as if they are coming from a certain direction. The direction embedder 210 during the training phase, allowed the adaptive network 225 in FIG. 2B to perform the direction detection function as part of the spatial filtering. Thus, in such a case, direction detector 403 and the device controller 491 may no longer be needed after a renderer 230 in an audio application 390*d*.

FIG. 4E is a block diagram of a particular illustrative aspect of a system operable to perform an inference of an adaptive network using learned weights in conjunction with an audio application, wherein an audio application includes use of a renderer in accordance with some examples of the present disclosure. As explained herein, transformed ambisonic coefficients 226 at the different time segments may be input into a renderer 230. The rendered transformed ambisonic coefficients may be played out of one or more loudspeaker(s) 240.

FIG. 4F is a block diagram of a particular illustrative aspect of a system operable to perform an inference of an adaptive network using learned weights in conjunction with an audio application, wherein an audio application includes use of the applications described in FIGS. 4C, FIG. 4D, and FIG. 4E in accordance with some examples of the present disclosure. Figure F is drawn in a way to show that the audio application 392 coupled to the adaptive network 225 may run after compressed transformed ambisonic coefficients 226 at the different time segments are decompressed with a decoder as explained in association with FIG. 3B.

Figure 5A:
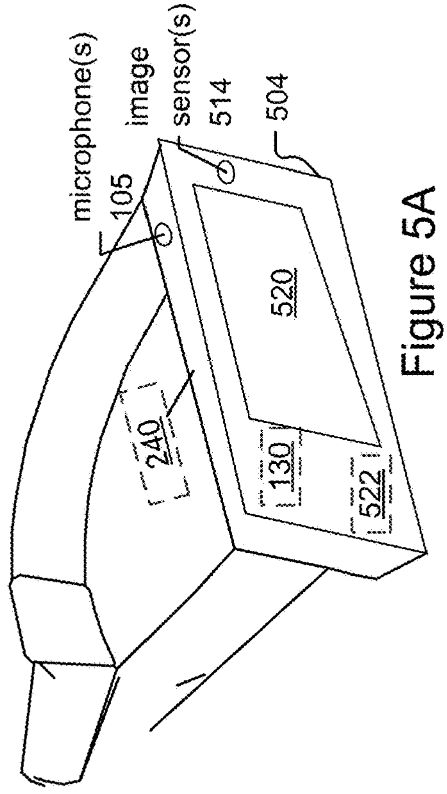
FIG. 5A is a diagram of a virtual reality or augmented reality glasses operable to perform an inference of an adaptive network, in accordance with some examples of the present disclosure.

Referring to FIG. 5A, a diagram of a device 201 placed in band so that it may be worn and operable to perform an inference of an adaptive network 225, in accordance with some examples of the present disclosure is illustrated. FIG.

5A depicts an example of an implementation of the device 201 of FIG. 2A, FIG. 2B, Figure C, FIG. 2D, FIG. 2E, FIG. 3A, FIG. 3B, FIG. 4A, FIG. 4B, FIG. 4C, FIG. 4D, FIG. 4E, or FIG. 4F, integrated into a mobile device 504, such as handset. Multiple sensors may be included in the handset. The multiple sensors may be two or more microphones 105, an image sensor(s) 514 (for example integrated into a camera). Although illustrated in a single location, in other implementations the multiple sensors can be positioned at other locations of the handset. A visual interface device, such as a display 520 may allow a user to also view visual content while hearing the rendered transformed ambisonic coefficients through the one more loudspeakers 240. In addition, there may be a transmitter 382 and a receiver 385 included in a transceiver 522 that provides connectivity between the device 201 described herein and a remote device.

Figure 5B:
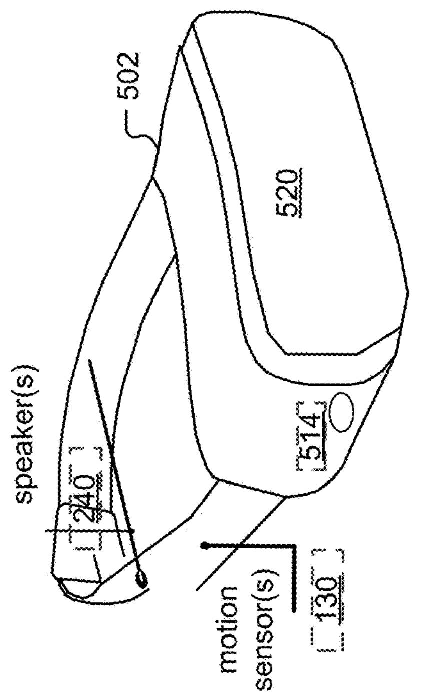
FIG. 5B is a diagram of a virtual reality or augmented reality headset operable to perform an inference of an adaptive network, in accordance with some examples of the present disclosure.

Referring to FIG. 5B, a diagram of a device 201, that may be virtual reality or augmented reality headset operable to perform an inference of an adaptive network 225, in accordance with some examples of the present disclosure is illustrated. FIG. 5A depicts an example of an implementation of the device 201 of FIG. 2A, FIG. 2B, Figure C, FIG. 2D, FIG. 2E, FIG. 3A, FIG. 3B, FIG. 4A, FIG. 4B, FIG. 4C, FIG. 4D, or FIG. 4E integrated into a mobile device 504, such as handset. Multiple sensors may be included in the headset. The multiple sensors may be two or more microphones 105, an image sensor(s) 514 (for example integrated into a camera). Although illustrated in a single location, in other implementations the multiple sensors can be positioned at other locations of the headset. A visual interface device, such as a display 520 may allow a user to also view visual content while hearing the rendered transformed ambisonic coefficients through the one more loudspeakers 240. In addition, there may be a transmitter 382 and a receiver 385 included in a transceiver 522 that provides connectivity between the device 201 described herein and a remote device.

Figure 5C:
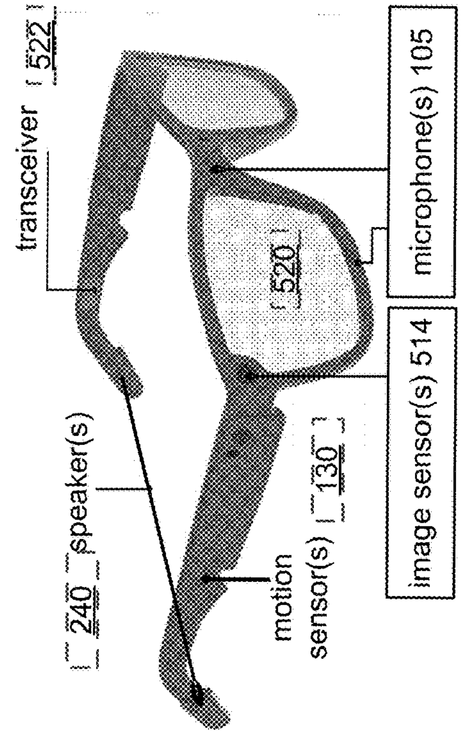
FIG. 5C is a diagram of a vehicle operable to perform an inference of an adaptive network, in accordance with some examples of the present disclosure.

Referring to FIG. 5C, a diagram of a device 201, that may be virtual reality or augmented reality glasses operable to perform an inference of an adaptive network 225, in accordance with some examples of the present disclosure is illustrated. FIG. 5A depicts an example of an implementation of the device 201 of FIG. 2A, FIG. 2B, Figure C, FIG. 2D, FIG. 2E, FIG. 3A, FIG. 3B, FIG. 4A, FIG. 4B, FIG. 4C, FIG. 4D, FIG. 4E, or FIG. 4F, integrated into glasses. Multiple sensors may be included in glasses. The multiple sensors may be two or more microphones 105, an image sensor(s) 514 (for example integrated into a camera). Although illustrated in a single location, in other implementations the multiple sensors can be positioned at other locations of the glasses. A visual interface device, such as a display 520 may allow a user to also view visual content while hearing the rendered transformed ambisonic coefficients through the one more loudspeakers 240. In addition, there may be a transmitter 382 and a receiver 385 included in a transceiver 522 that provides connectivity between the device 201 described herein and a remote device.

Figure 5D:
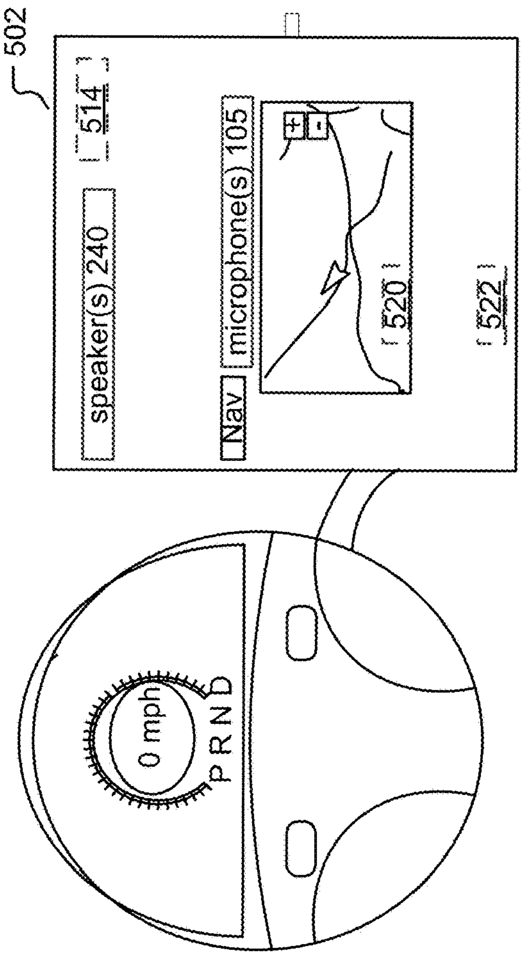
FIG. 5D is a diagram of a handset operable to perform an inference of an adaptive network, in accordance with some examples of the present disclosure.

Referring to FIG. 5D, a diagram of a device 201, that may be operable to perform an inference of an adaptive network 225, in accordance with some examples of the present disclosure is illustrated. FIG. 5D depicts an example of an implementation of the device 201 of FIG. 2A, FIG. 2B, Figure C, FIG. 2D, FIG. 2E, FIG. 3A, FIG. 3B, FIG. 4A, FIG. 4B, FIG. 4C, FIG. 4D, FIG. 4E, or FIG. 4F, integrated into a vehicle dashboard device, such as a car dashboard device 502. Multiple sensors may be included in the vehicle. The multiple sensors may be two or more microphones 105, an image sensor(s) 514 (for example integrated into a camera). Although illustrated in a single location, in other implementations the multiple sensors can be positioned at other locations of the vehicle, such as distributed at various locations within a cabin of the vehicle, or that may be located proximate to each seat in the vehicle to detect multi-modal inputs from a vehicle operator and from each passenger. A visual interface device, such as a display 520 is mounted or positioned (e.g., removably fastened to a vehicle handset mount) within the car dashboard device 502 to be visible to a driver of the car. In addition, there may be a transmitter 382 and a receiver 385 included in a transceiver 522 that provides connectivity between the device 201 described herein and a remote device.

Figure 6B:
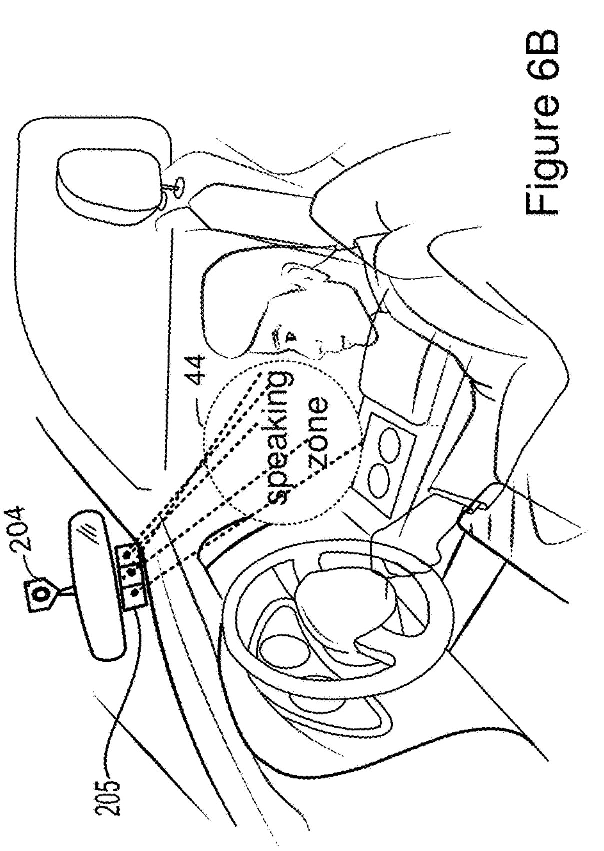
FIG. 6B is a diagram of a device that is operable to perform an inference of an adaptive network 225, wherein the device is capable of capturing speech in a speaker zone, in accordance with some examples of the present disclosure is illustrated.
Figure 6D:
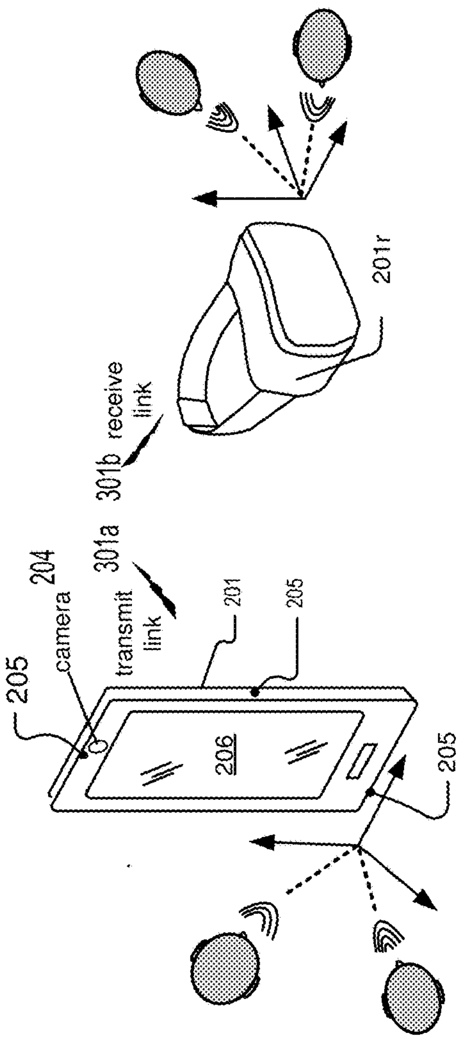
FIG. 6D is a diagram of a device that is operable to perform an inference of an adaptive network 225, wherein the device is capable of capable of capturing at least two audio sources from different directions, transmitting them over a wireless link to a remote device, wherein the remote device is capable of rendering the audio sources in accordance with some examples of the present disclosure is illustrated.
Figure 6A:
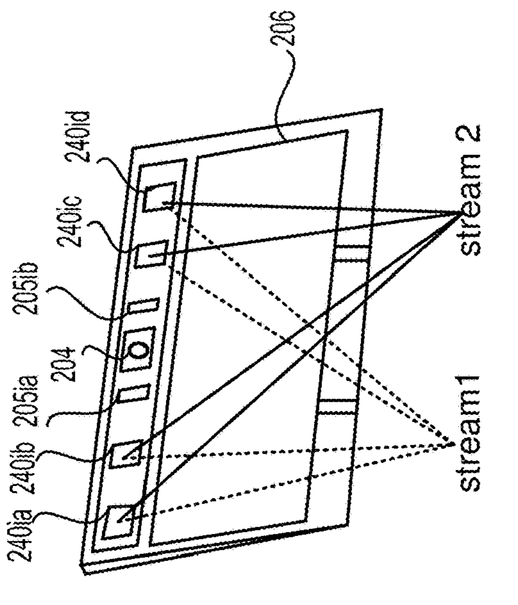
FIG. 6A is a diagram of a device that is operable to perform an inference of an adaptive network 225, wherein the device renders two audio streams in different directions, in accordance with some examples of the present disclosure is illustrated.

Referring to FIG. 6A, a diagram of a device 201 (e.g., a television, a tablet, or laptop, a billboard, or device in a public place) and is operable to perform an inference of an adaptive network 225*g*, in accordance with some examples of the present disclosure is illustrated. In FIG. 6A, the device 201 may optionally include a camera 204, and a loudspeaker array 240 which includes individual speakers 240*ia*, 240*ib*, 240*ic*, 240*id*, and a microphone array 205 which includes individual microphones 205*ia*, 205*ib*, and a display screen 206. The techniques described in association with FIG. 2A-2E, FIGS. 3A-3B, FIGS. 4A-4F, and FIG. 5A may be implemented in the device 201 illustrated in FIG. 6A. In an embodiment, there may be multiple audio sources that are represented with transformed ambisonic coefficients 226.

The loudspeaker array 240 is configured to output the rendered transformed ambisonic coefficients 226 rendered by a renderer 230 included in the device 201. The transformed ambisonic coefficients 226 represent different audio sources directed into a different respective direction (e.g., stream 1 and stream 2 are emitted into two different respective directions). One application of simultaneous transmission of different streams may be for a public address and/or video billboard installations in public spaces, such as an airport or railway station or another situation in which a different messages or audio content may be desired. For example, such a case may be implemented so that the same video content on a display screen 206 is visible to each of two or more users, with the loudspeaker array 240 outputting the transformed ambisonic coefficients 226 at different time segments to represent the same accompanying audio content in different languages (e.g., two or more of English, Spanish, Chinese, Korean, French, etc.) different respective viewing angles. Presentation of a video program with simultaneous presentation of the accompanying transformed ambisonic coefficients 226 representing the audio content in two or more languages may also be desirable in smaller settings, such as a home or office.

Another application where the audio components represented by the transformed ambisonic coefficients may include different far-end audio content is for voice communication (e.g., a telephone call). Alternatively, or additionally, each of two or more audio sources represented by the transformed ambisonic coefficients 226 at different time segments may include an audio track for a different respective media reproduction (e.g., music, video program, etc.).

For a case in which different audio sources represented by the transformed ambisonic coefficients 226 are associated with different video content, it may be desirable to display such content on multiple display screens and/or with a multiview-capable display screen (e.g., the display screen 206 may also be a multiview-capable display screen). One example of a multiview-capable display screen is configured to display each of the video programs using a different light polarization (e.g., orthogonal linear polarizations, or circular polarizations of opposite handedness), and each viewer wears a set of goggles that is configured to pass light having the polarization of the desired video program and to block light having other polarizations. In another example of a multiview-capable display screen, a different video program is visible at least of two or more viewing angles. In such a case, implementation the loudspeaker array direct the audio source for each of the different video programs in the direction of the corresponding viewing angle.

In a multi-source application, it may be desirable to provide about thirty or forty to sixty degrees of separation between the directions of orientation of adjacent audio sources represented by the transformed ambisonic coefficients 226. One application is to provide different respective audio source components to each of two or more users who are seated shoulder-to-shoulder (e.g., on a couch) in front of the loudspeaker array 240. At a typical viewing distance of 1.5 to 2.5 meters, the span occupied by a viewer is about thirty degrees. With an array 205 of four microphones, a resolution of about fifteen degrees may be possible. With an array having more microphones, a narrower distance between users may be possible.

Referring to FIG. 6B, a diagram of a device 201 (e.g., a vehicle) and is operable to perform an inference of an adaptive network 225, 225*g*, in accordance with some examples of the present disclosure is illustrated. In FIG. 6B, the device 201 may optionally include a camera 204, and a loudspeaker array 240 (not shown) and a microphone array 205. The techniques described in association with FIG. 2A-2E, FIGS. 3A-3B, FIGS. 4A-4F, and FIGS. 5D, may be implemented in the device 201 illustrated in FIG. 6B.

In an embodiment, the transformed ambisonic coefficients 226 output by the adaptive network 225 may represent the speech captured in a speaker zone 44. As illustrated, there may be a speaker zone 44 for a driver. In addition, or alternatively, there may be a speaker zone 44 for each passenger also. The adaptive network 225 may output the transformed ambisonic coefficients 226 based on the constraint 260*b*, constraint 260*d*, or some combination thereof. As there may be road noise while driving, the audio or noise outside of the speaker zone represented by the transformed ambisonic coefficients 226, when rendered (e.g., if on a phone call) may sound more attenuated because of the spatial filtering properties of the adaptive network 225. In another example, the driver or a passenger may be speaking a command to control a function in the vehicle, and the command represented by transformed ambisonic coefficients 226 may be used based on the techniques described in association with FIG. 4D.

Figure 6C:
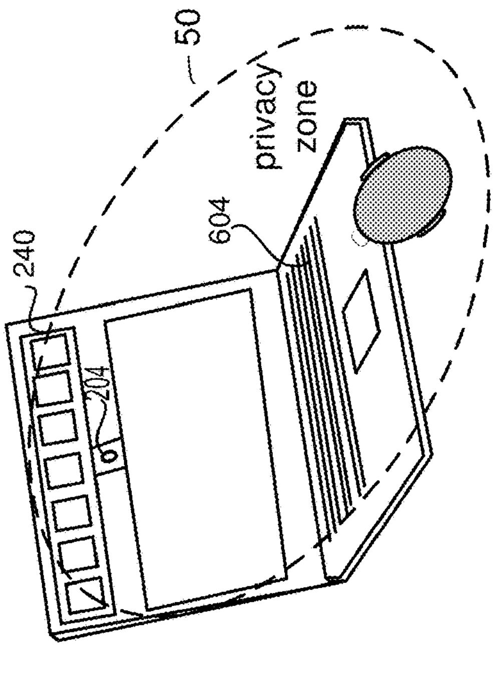
FIG. 6C is a diagram of a device that is operable to perform an inference of an adaptive network 225, wherein the device is capable of rendering audio in a privacy zone, in accordance with some examples of the present disclosure is illustrated.

Referring to FIG. 6C, a diagram of a device 201 (e.g., a television, a tablet, or laptop) and is operable to perform an inference of an adaptive network 225, in accordance with some examples of the present disclosure is illustrated. In FIG. 6B, the device 201 may optionally include a camera 204, and a loudspeaker array 240 which includes individual speakers 240*ia*, 240*ib*, 240*ic*, 240*id*, and a microphone array 205 which includes individual microphones 205*ia*, 205*ib*, and a display screen 206. The techniques described in association with FIG. 2A-2E, FIGS. 3A-3B, FIGS. 4A-4F, and FIGS. 5A-5C, may be implemented in the device 201 illustrated in FIG. 6C. In an embodiment, there may be multiple audio sources that are represented with transformed ambisonic coefficients 226.

As privacy may be a concern, the transformed ambisonic coefficients 226 may represent audio content that when rendered by a loudspeaker array 240 are directed to sound louder in a privacy zone 50, but outside of the privacy sound softer, e.g., by using a combination of the techniques described associated with FIG. 2B, FIG. 2C, FIG. 2D and/or FIG. 2E. A person who is outside the privacy zone 50 may bear an attenuated version of the audio content. It may be desirable for the device 201 to activate a privacy zone mode in response to an incoming and/or an outgoing telephone call. Such an implementation on the device 201 may occur when the user desires more privacy. It may be desirable to increase the privacy outside of the privacy zone 50 by using a masking signal whose spectrum is complementary to the spectrum of the one or more audio sources that are to be heard within the privacy zone 50. The masking signal may also be represented by the transformed ambisonic coefficients 226. For example, the masking signal may be in spatial directions that are outside of a certain range of angles where the speech (received via the phone call) is received so that nearby people in the dark zone (the area outside of the privacy zone) hear a "white" spectrum of sound, and the privacy of the user is protected. the user. In an alternative phone-call scenario, the masking signal is babble noise whose level just enough to be above the sub-band masking thresholds of the speech and when the transformed ambisonic coefficients are rendered, babble noise is heard in the dark zone.

In another use case, the device is used to reproduce a recorded or streamed media signal, such as a music file, a broadcast audio or video presentation (e.g., radio or television), or a movie or video clip streamed over the Internet. In this case, privacy may be less important, and it may be desirable for the device 201 to have the desired audio content to have a substantially reduced amplitude level over time in the dark zone, and normal range in the privacy zone 50. A media signal may have a greater dynamic range and/or may be less sparse over time than a voice communications signal.

Referring to FIG. 6D, a diagram of a device 201 (e.g., a handset, tablet, laptop, television) and is operable to perform an inference of an adaptive network 225, in accordance with some examples of the present disclosure is illustrated. In FIG. 6D, the device 201 may optionally include a camera 204, and a loudspeaker array 240 (not shown) and a microphone array 205. The techniques described in association with FIG. 2A-2E, FIGS. 3A-3B, FIGS. 4A-4F, and FIGS. 5A-C, may be implemented in the device 201 illustrated in FIG. 6D.

In an embodiment, the audio from two different audio sources (e.g., two people talking) may be located in different locations and may be represented by the transformed ambisonic coefficients 226 output of the adaptive network 225. The transformed ambisonic coefficients 226 may be compressed and transmitted over a transmit link 301*a*. A remote device 201*r* may receive the compressed transformed ambisonic coefficients, uncompress them and provide them to a renderer 230 (not shown). The rendered uncompressed transformed ambisonic coefficients may be provide to the loudspeaker array 240 (e.g., in a binaural form) and heard by remote user (e.g., wearing the remote device 201*r*).

Figure 7A:
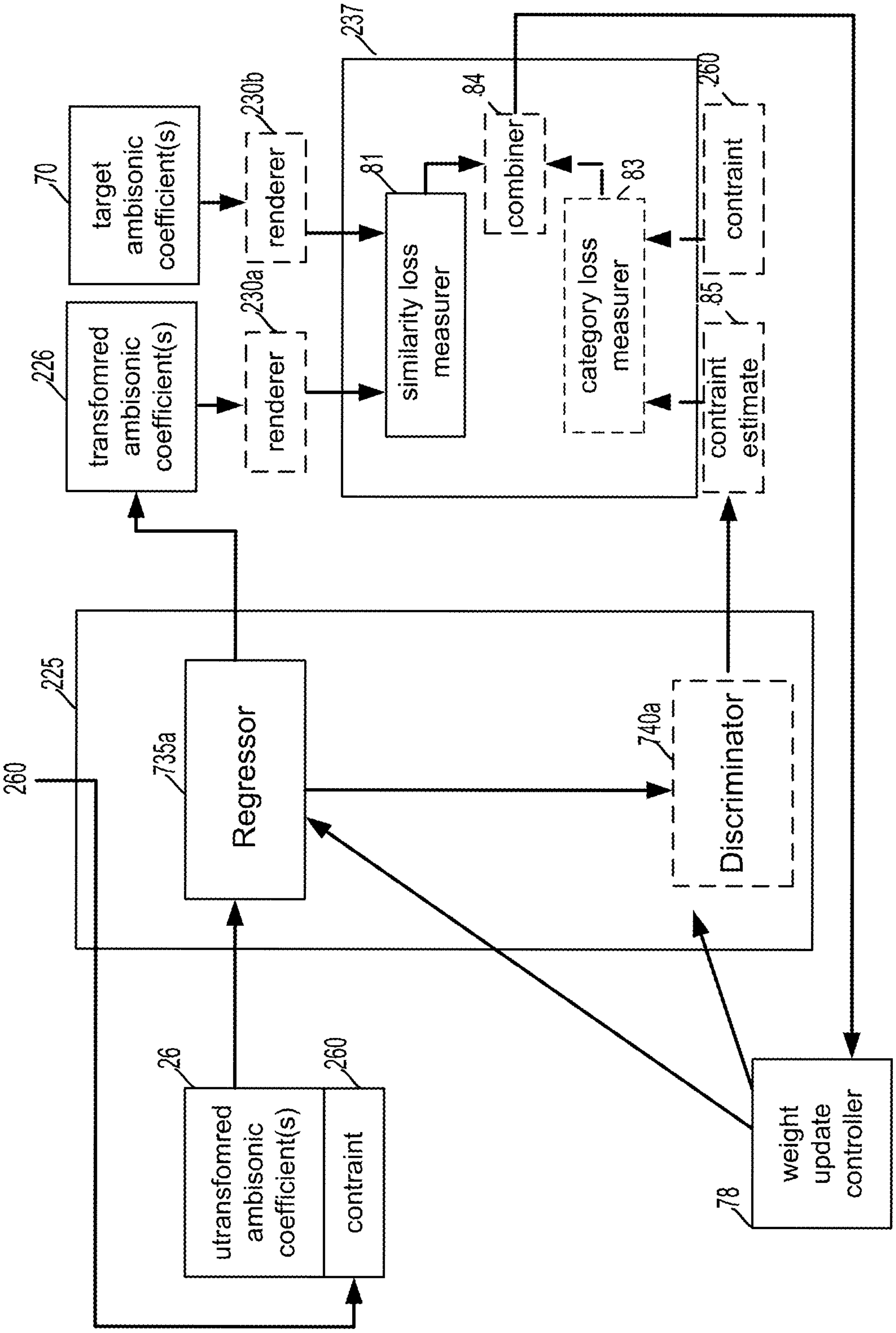
FIG. 7A is a diagram of an adaptive network operable to perform training in accordance with some examples of the present disclosure, where the adaptive network includes a regressor and a discriminator.

Referring to FIG. 7A, FIG. 7A is a diagram of an adaptive network operable to perform training in accordance with some examples of the present disclosure, where the adaptive network includes a regressor and a discriminator. The discriminator 740*a* may be optional. However, when a constraint 260 is concatenated with the untransformed ambisonic coefficients 26, the output transformed ambisonic coefficients 226 of an adaptive network 225 may have an extra set of bits or other output which may be extracted. The extra set of bits or other output which is extracted is an estimate of the constraint 85. The constraint estimate 85 and the constraint 260 may be compared with a category loss measurer 83. The category loss measure may include operations that the similarity loss measurer includes, or some other error function. The transformed ambisonic coefficient(s) 226 may be compared with the target ambisonic coefficient(s) 70 using one of the techniques used by the similarity loss measurer 81. Optionally, renderers 230*a* 230*b* may render the transformed ambisonic coefficient(s) 226 and target ambisonic coefficient(s) 70, respectively, and the renderer 230*a* 230*b* outputs may be provided to the similarity loss measurer 81. The similarity measurer 81 may be included in the error measurer 237 that was described in association with FIG. 2A.

There are different ways to implement how to calculate a similarity loss measures (S) 81. In the different equations shown below E is equal to the expectation value, K is equal to the max number of ambisonic coefficients for a given order, and c is the coefficient number that ranges between 1 and K. X is the transformed ambisonic coefficients, and T is the target ambisonic coefficients. In an implementation, for a $4^{th}$ order ambisonics signal, the total number of ambisonics coefficients (K) is 25.

One way is to implement the similarity loss measure S as a correlation as follows:

for k=1:K{S (k)=E[T (c)X(c+k)]/(sqrt(E[T (k)]2)sqrt(ERX $(k)]^2$]), where comparing all of the S (k)'s yields the maximum similarity value.

Another way to implement S is, as a cumulant equation, as follows:

for k=1:K $\{S(k)=\{E[T^2(c)X(c+k)^2+E\ [T^2\ (c)]E[X(k)^2]-2E\ [T_i(c)X(c+k)]^2\}$, where comparing all of the S (k)'s yields the maximum similarity value.

Another way to implement S, uses a time-domain least squares fit as follows:

for k=1:K $\{S\ (k)=\{\Sigma_{frame=0}^{audio\ source\ phrase\_frames}\|T_i(c)-X(c+k)\|^2\}$ where comparing all of the S (k)'s yields the maximum similarity value. Note that instead of using the expectation value as shown above, another way to represent the expectation is to include using at least an express summation over at least the number of frames (audio source phrase frames) that make up the audio source phrase is used.

Another way to implement S, uses a fast Fourier transform (FFT) in conjunction with the frequency domain is as follows:

for k=1:K $\{S\ (k)=\{\Sigma_{frame=0}^{word\_frames}\Sigma_{f=1}^{f\_frame}\|T_i(f)\exp(-j\omega k))\|^2\}$, where comparing all of the S(k)'s yields the maximum similarity value. Note that there is an additional summation over the different frequencies (f=1 . . . f_frame) used in the FFT.

Another way is to implement S, uses an Itakura-Saito distance as follows:

for k=1:K $\{S\ (k)=\{\Sigma_{frame=0}^{word\_frames}\Sigma_{f=1}^{f\_frame}\|T_i(f)\exp(-j\omega k))-\log[T_i(f)/X(f)\exp(-(-j\omega k)]^{-1}\|\}$, where comparing all of the S(k)'s yields the maximum similarity value.

Another way to implement S is based on a square difference measure as follows:

for k=1:K $S(k)=\{\Sigma_{frame=0}^{word\_frames}(T(k)-X(k))^2\}$ where comparing all of the S(k)'s yields the maximum similarity value.

In an embodiment, the error measurer 237 may also include the category loss measurer 83 and a combiner 84 to combine (e.g., add, or serially output) the output of the category loss measurer 83 and the similarity loss measurer 81. The output of the error measurer 237 may directly update the weights of the adaptive network 225 or they may be updated by the use of a weight update controller 78.

A regressor 735*a* is configured to estimate a distribution function from the input variables (untransformed ambisonic coefficients, and concatenated constraints) to a continuous output variable, the transformed ambisonic coefficients. A neural network is an example of a regressor 735*a*. A discriminator 740*a* is configured to estimate a category or class of inputs. Thus, the estimated constraints extracted from the estimate of the transformed ambisonic coefficient(s) 226 may also be classified. Using this additional technique may aid with the training process of the adaptive network 225, and in some cases may improve the resolution of certain constraint values, e.g., finer degrees or scaling values.

Figure 7B:
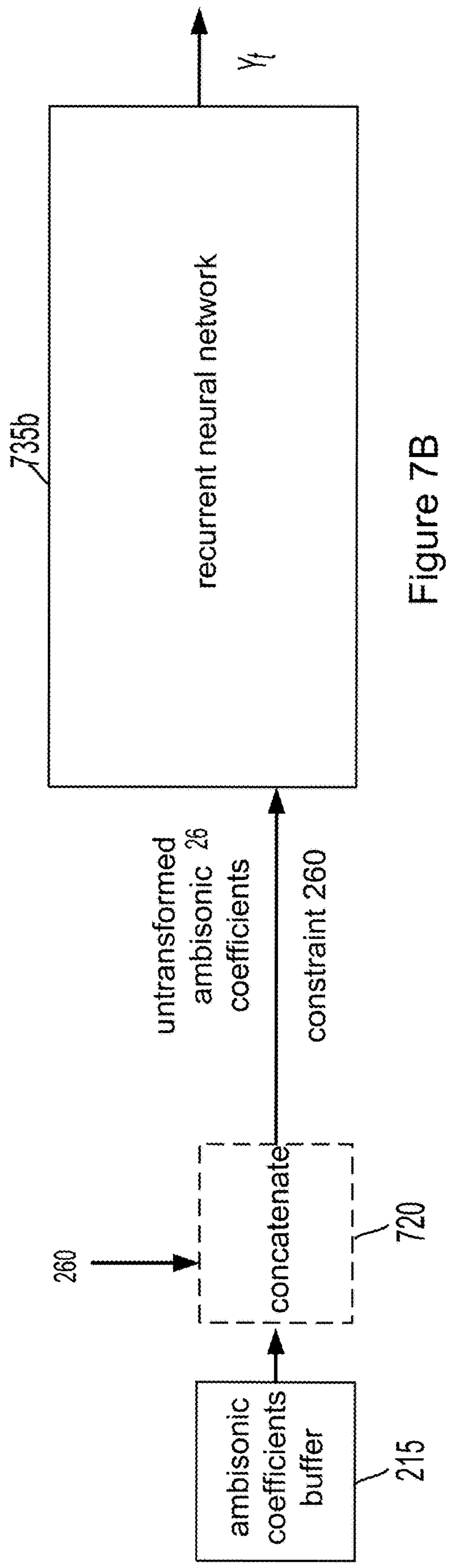
FIG. 7B is a diagram of an adaptive network operable to perform an inference in accordance with some examples of the present disclosure, where the adaptive network is a recurrent neural network (RNN).

Referring to FIG. 7B, a diagram of an adaptive network operable to perform an inference in accordance with some examples of the present disclosure, where the adaptive network is a recurrent neural network (RNN) is illustrated.

In an embodiment, the ambisonic coefficients buffer 215 may be coupled to the adaptive network 225, where the adaptive network 225 may be an RNN 735*b* that outputs the transformed ambisonic coefficients 226. A recurrent neural network may refer to a class of artificial neural networks where connections between units (or cells) form a directed graph along a sequence. This property may allow the recurrent neural network to exhibit dynamic temporal behavior (e.g., by using internal states or memory to process sequences of inputs). Such dynamic temporal behavior may distinguish recurrent neural networks from other artificial neural networks (e.g., feedforward neural networks).

Figure 7C:
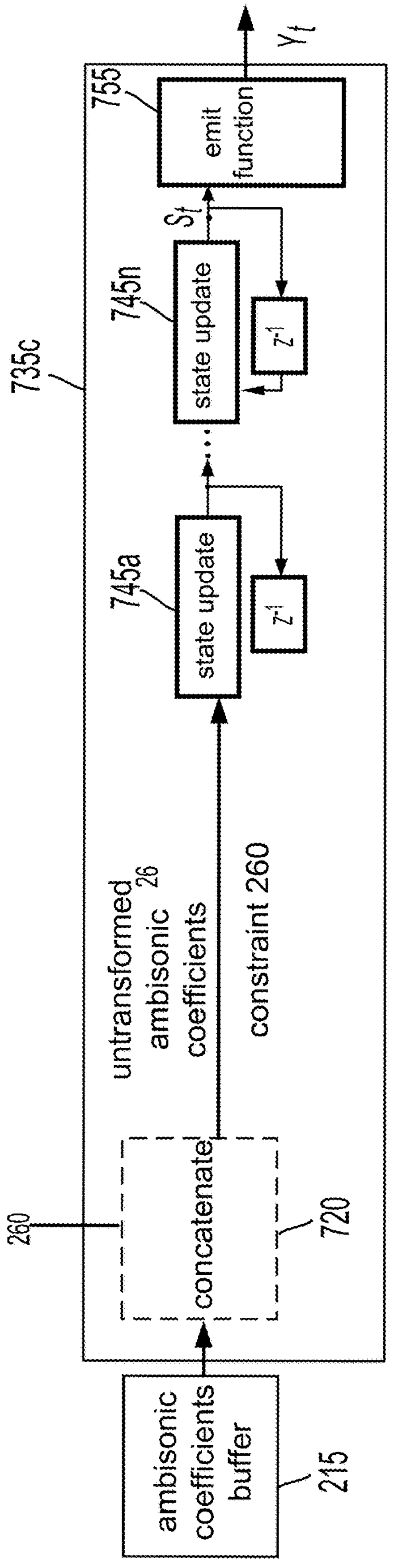
FIG. 7C is a diagram of an adaptive network operable to perform an inference in accordance with some examples of the present disclosure, where the adaptive network is a long short-term memory (LSTM).

Referring to FIG. 7C, a diagram of an adaptive network le operable to perform an inference in accordance with some examples of the present disclosure, where the adaptive network is a long short-term memory (LSTM) is illustrated.

In an embodiment, an LSTM is one example of an RNN. An LSTM network 735B, may be composed of multiple storage states (e.g., which may be referred to as gated states, gated memories, or the like), which storage states may in some cases be controllable by the LSTM network 735*c*. Specifically, each storage state may include a cell, an input gate, an output gate, and a forget gate. The cell may be responsible for remembering values over arbitrary time intervals. Each of the input gate, output gate, and forget gate may be an example of an artificial neuron (e.g., as in a feedforward neural network). That is, each gate may compute an activation (e.g., using an activation function) of a weighted sum, where the weighted sum may be based on training of the neural network. Although described in the context of LSTM networks, it is to be understood that the described techniques may be relevant for any of a number of artificial neural networks (e.g., including hidden Markov models, feedforward neural networks, etc.).

During the training phase, the constraint block and adaptive network may be trained based on applying a loss function. In aspects of the present disclosure, a loss function may generally refer to a function that maps an event (e.g., values of one or more variables) to a value that may represent a cost associated with the event. In some examples, the LSTM network may be trained by adjusting the weighted sums used for the various gates, by adjusting the connectivity between different cells, or the like) so as to minimize the loss function. In an example, the loss function may be an error between target ambisonic coefficients and the ambisonic coefficients (i.e., input training signals) captured by a microphone array 205 or provided in synthesized form.

For example, the LSTM network 735*c* (based on the loss function) may use a distribution function that approximates an actual (e.g., but unknown) distribution of the input training signals. By way of example, when training the LSTM network 735B based on the input training signals from different directions, the distribution function may resemble different types of distributions, e.g., a Laplacian distribution or Super Gaussian distribution. At the output of the LSTM an estimate of the target ambisonic coefficients may be generated based at least in part on application of a maximizing function to the distribution function. For example, the maximizing function may identify an argument corresponding to a maximum of distribution function.

In some examples, input training signals may be received by the microphone array 205 of a device 201. Each input training signal received may be sampled based on a target time window, such that the input audio signal for microphone N of the device 201 may be represented as $x_t^N=(y_t, \alpha, mic^N)+n_t^N$ where $y_t$ represents the target auditory source (e.g. an estimate of the transformed ambisonic coefficients), $\alpha$ represents a directionality constant associated with the source of the target auditory source, $mic^N$ represents the microphone of the microphone array 205 that receives the target auditory source, and $n_t^N$ represents noise artifacts received at microphone N. In some cases, the target time window may span from a beginning time $T_b$ to a final time $T_f$, e.g., a subframe or a frame, or the length of a window used to smooth data. Accordingly, the time segments of input signals received at the microphone array 205 may correspond to times $t-T_b$ to $t+T_f$. Though described in the context of a time window, it is to be understood that the time segments of the input signals received at microphone array 205 may additionally or alternatively correspond to samples in the frequency domain (e.g., samples containing spectral information).

In some cases, the operations during the training phase of the LSTM 735*c* may be based at least in part on a set of samples that correspond to a time $t+T_f-1$ (e.g., a set of previous samples). The samples corresponding to time $t+T_f-1$ may be referred to as hidden states in a recurrent neural network 735Aa and may be denoted according to $h_{t+T_f-1}^M$, where M corresponds to a given hidden state of the neural network. That is, the recurrent neural network may contain multiple hidden states (e.g., may be an example of a deep-stacked neural network), and each hidden state may be controlled by one or more gating functions as described above.

In some examples, the loss function may be defined according to $p(z|x_{t+T_f}^1, \ldots, x_{t+T_f}^N, h_{t+T_f-1}^1, \ldots h_{t+T_f-1}^M)$, where z represents a probability distribution given the input signals received and the hidden states of the neural network, where M is the memory capacity, as there are M hidden states, and $T_f-1$ represents a lookahead time. That is, the operations of the LSTM network 735*a* may relate the probability that the samples of the input signals received at the microphone array 205 match a learned distribution function z of desired ambisonic coefficients based on the loss function identified.

In an embodiment, associated with the description of FIG. 2B, a direction-of-arrival (DOA) embedder may determine a time-delay for each microphone associated with each audio source based on a directionality associated with a direction, or angle (elevation and/or azimuth) as described with reference to FIG. 2B. That is, a target ambisonic coefficients for an audio source may be assigned a directionality constraint (e.g., based on the arrangement of the microphones) such that coefficients of the target ambisonic coefficients may be a function of the directionality constraint 360*b*. The ambisonic coefficients may be generated based at least in part on the determined time-delay associated with each microphone.

The ambisonic coefficients may then be processed according to state updates based at least in part on the directionality constraint 226. Each state update may reflect the techniques described with reference to FIG. 2B. That is a plurality of state updates (e.g., state update 745*a* through state update 745*n*). Each state update 745 may be an example of a hidden state (e.g., a LSTM cell as described above). That is, each state update 745 may operate on an input (e.g., samples of ambisonic coefficients, an output from a previous state update 745, etc.) to produce an output. In some cases, the operations of each state update 745 may be based at least in part on a recursion (e.g., which may update a state of a cell based on the output from the cell). In some cases, the recursion may be involved in training (e.g., optimizing) the recurrent neural network 735*a*.

At the output of the LSTM network an emit function may generate the target ambisonic coefficients 226. It is to be understood that any practical number of state updates 715 may be included without deviating from the scope of the present disclosure.

Referring to FIG. 8, a flow chart of a method of performing applying at least one adaptive network, based on a constraint, in accordance with some examples of the present disclosure is illustrated.

In FIG. 8, one or more operations of the method 800 are performed by one or more processors. The one or more processors included in the device 201 may implement the techniques described in association with FIGS. 2A-2G, 3A-3B, 4A-4F, 5A-5D, 6A-6D, 7A-7B, and 9.

The method 800 includes the operation of obtaining the untransformed ambisonic coefficients at the different time segments, where the untransformed ambisonic coefficients at the different time segments represent a soundfield at the different time segments 802. The method 800 also includes the operation of applying at least one adaptive network, based on a constraint, to the untransformed ambisonic coefficients at the different time segments to output transformed ambisonic coefficients at the different time segments, wherein the transformed ambisonic coefficients at the different time segments represent a modified soundfield at the different time segments, that was modified based on the constraint 804.

Figure 9:
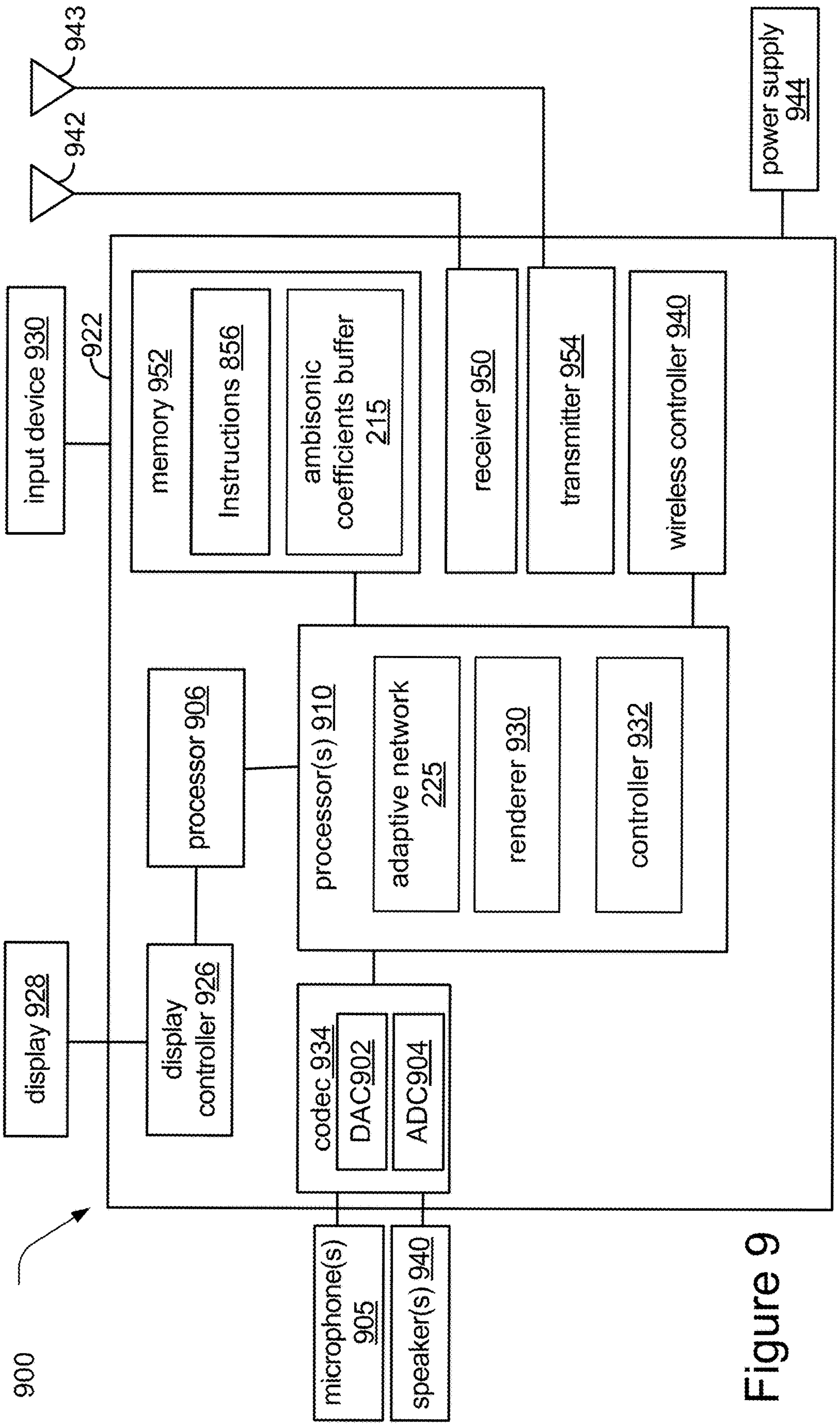
FIG. 9 is a block diagram of a particular illustrative example of a device that is operable to perform applying at least one adaptive network, based on a constraint, in accordance with some examples of the present disclosure.

Referring to FIG. 9, a block diagram of a particular illustrative example of a device that is operable to perform applying at least one adaptive network, based on a constraint, in accordance with some examples of the present disclosure is illustrated.

Referring to FIG. 9, a block diagram of a particular illustrative implementation of a device is depicted and generally designated 900. In various implementations, the device 900 may have more or fewer components than illustrated in FIG. 9. In an illustrative implementation, the device 900 may correspond to the device 201 of FIG. 2A. In an illustrative implementation, the device 900 may perform one or more operations described with reference to FIG. 1, FIGS. 2A-F, FIG. 3A-B, FIGS. 4A-F, FIGS. 5A-D, FIGS. 6A-D, FIG. 7A-B, and FIG. 8.

In a particular implementation, the device 900 includes a processor 906 (e.g., a central processing unit (CPU)). The device 900 may include one or more additional processors 910 (e.g., one or more DSPs, GPUs, CPUs, or audio core). The one or more processor(s) 910 may include the adaptive network 225, the renderer 230, and the controller 932 or a combination thereof. In a particular aspect, the one or more processor(s) 208 of FIG. 2A corresponds to the processor 906, the one or more processor(s) 910, or a combination thereof. In a particular aspect, the controller 25*f* of FIG. 2F, or the controller 25*g* of FIG. 2G corresponds to the controller 932.

The device 900 may include a memory 952 and a codec 934. The memory 952 may include the ambisonics coefficient buffer 215, and instructions 956 that are executable by the one or more additional processors 810 (or the processor 806) to implement one or more operations described with reference to FIG. 1, FIGS. 2A-F, FIG. 3, FIG. 4A-H, FIG. 5A-D, FIG. 6A-B, and FIG. 7. In a particular aspect the memory 952 may also include to other buffers, e.g., buffer 30*i*. In an example, the memory 952 includes a computer-readable storage device that stores the instructions 956. The instructions 956, when executed by one or more processors (e.g., the processor 908, the processor 906, or the processor 910, as illustrative examples), cause the one or more processors to obtain the untransformed ambisonic coefficients at the different time segments, where the untransformed ambisonic coefficients at the different time segments represent a soundfield at the different time segments, and apply at least one adaptive network, based on a constraint, to the untransformed ambisonic coefficients at the different time segments to generate transformed ambisonic coefficients at the different time segments, wherein the transformed ambisonic coefficients at the different time segments represent a modified soundfield at the different time segments, that was modified based on the constraint.

The device 900 may include a wireless controller 940 coupled, via a receiver 950, to a receive antenna 942. In addition, or alternatively, the wireless controller 940 may also be coupled, via a transmitter 954, to a transmit antenna 943.

The device 900 may include a display 928 coupled to a display controller 926. One or more speakers 940 and one or more microphones 905 may be coupled to the codec 934. In a particular aspect, the microphone 905 may be implemented as described with respect to the microphone array 205 described within this disclosure. The codec 934 may include or be coupled to a digital-to-analog converter (DAC) 902 and an analog-to-digital converter (ADC) 904. In a particular implementation, the codec 934 may receive analog signals from the one or more microphone(s) 905, convert the analog signals to digital signals using the analog-to-digital converter 904, and provide the digital signals to the one or more processor(s) 910. The processor(s) 910 (e.g., an audio codec, or speech and music codec) may process the digital signals, and the digital signals may further be processed by the ambisonic coefficients buffer 215, the adaptive network 225, the renderer 230, or a combination thereof. In a particular implementation, the adaptive network 225 may be integrated as part of the codec 934, and the codec 934 may reside in the processor(s) 910.

In the same or alternate implementation, the processor(s) 910 (e.g., the audio code, or the speech and music codec) may provide digital signals to the codec 934. The codec 934 may convert the digital signals to analog signals using the digital-to-analog converter 902 and may provide the analog signals to the speakers 936. The device 900 may include an input device 930. In a particular aspect, the input device 930 includes the image sensor 514 which may be included in a camera of FIGS. 5A-5D, and FIGS. 6A-6D. In a particular aspect the codec 934 corresponds to the encoder and decoder described in the audio applications described in association with FIGS. 4A, 4B, 4F, and FIGS. 6A-6D.

In a particular implementation, the device 900 may be included in a system-in-package or system-on-chip device 922. In a particular implementation, the memory 952, the processor 906, the processor 910, the display controller 926, the codec 934, and the wireless controller 940 are included in a system-in-package or system-on-chip device 922. In a particular implementation, the input device 930 and a power supply 944 are coupled to the system-in-package or system-on-chip device 922. Moreover, in a particular implementation, as illustrated in FIG. 9, the display 928, the input device 930, the speaker(s) 940, the microphone(s) 905, the receive antenna 942, the transmit antenna 943, and the power supply 944 are external to the system-in-package or system-on-chip device 922. In a particular implementation, each of the display 928, the input device 930, the speaker(s) 940, the microphone(s) 905, the receive antenna 942, the transmit antenna 943, and the power supply 944 may be coupled to a component of the system-in-package or system-on-chip device 922, such as an interface or a wireless controller 940.

The device 900 may include a portable electronic device, a car, a vehicle, a computing device, a communication device, an internet-of-things (IoT) device, a virtual reality (VR) device, a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof. In a particular aspect, the processor 906, the processor(s) 910, or a combination thereof, are included in an integrated circuit.

In conjunction with the described implementations, a device includes means for storing untransformed ambisonic coefficients at different time segments includes the ambisonic coefficients buffer 215 of FIG. 2A-2E, 3A-3B, 4A-4F, 7A-7C. The device also includes the one or more processors 208 of FIG. 2A, and one or more processors 910 of FIG. 9 with means for obtaining the untransformed ambisonic coefficients at the different time segments, where the untransformed ambisonic coefficients at the different time segments represent a soundfield at the different time segments. The one or more processors 208 of FIG. 2A, and one or more processors of FIG. 9 also include means for applying at least one adaptive network, based on a constraint, to the untransformed ambisonic coefficients at the different time segments to generate transformed ambisonic coefficients at the different time segments, wherein the transformed ambisonic coefficients at the different time segments.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Particular aspects of the disclosure are described below in a first set of interrelated clauses:

According to Clause 1B, a method includes: a storing untransformed ambisonic coefficients at different time segments; obtaining the untransformed ambisonic coefficients at the different time segments, where the untransformed ambisonic coefficients at the different time segments represent a soundfield at the different time segments; and applying one adaptive network, based on a constraint, to the untransformed ambisonic coefficients at the different time segments to generate transformed ambisonic coefficients at the different time segments, wherein the transformed ambisonic coefficients at the different time segments represent a modified soundfield at the different time segments, that was modified based on the constraint.

Clause 2B includes the method of clause 1B, wherein the constraint includes preserving a spatial direction of one or more audio sources in the soundfield at the different time segments, and the transformed ambisonic coefficients at the different time segments, represent a modified soundfield at the different time segments, that includes the one or more audio sources with the preserved spatial direction.

Clause 3B includes the method of clause 2B, further comprising compressing the transformed ambisonic coefficients, and further comprising transmitting the compressed transformed ambisonic coefficients over a transmit link.

Clause 4B includes the method of clause 2B, further comprising receiving compressed transformed ambisonic coefficients, and further comprising uncompressing the transformed ambisonic coefficients.

Clause 5B includes the method of clause 2B, further comprising converting the untransformed ambisonic coefficients, and the constraint includes preserving the spatial direction of one or more audio sources in the soundfield comes from a speaker zone in a vehicle.

Clause 6B includes the method of clause 2B, further comprising an additional adaptive network, and an additional constraint input into the additional adaptive network configured to output additional transformed ambisonic coefficients, wherein the additional constraint includes preserving a different spatial direction than the constraint.

Clause 7B includes method of clause 6B, further comprising linearly adding the additional transformed ambisonic coefficients and the transformed ambisonic coefficients.

Clause 8B includes the method of clause 7B, further comprising rendering the transformed ambisonic coefficients in a first spatial direction and rendering the additional transformed ambisonic coefficients in a different spatial direction.

Clause 9B includes the method of clause 8B, wherein the transformed ambisonic coefficients in the first spatial direction are rendered to produce sound in a privacy zone.

Clause 10B includes the method of clause 9B, wherein the additional transformed ambisonic coefficients in the different spatial direction, represent a masking signal, and are rendered to produce sound outside of the privacy zone.

Clause 11B includes the method of clause 9B, wherein the sound in the privacy zone is louder than sound produced outside of the privacy zone.

Clause 12 B include the method of clause 9B, wherein a privacy zone mode is activated in response to an incoming or an outgoing telephone call.

Clause 13B includes method of clause 1B, wherein the constraint includes scaling the soundfield, at the different time segments by a scaling factor, wherein application of the scaling factor amplifies at least a first audio source in the soundfield represented by the untransformed ambisonic coefficients at the different time segments, wherein the transformed ambisonic coefficients, at the different time segments, represent a modified soundfield, at the different time segments, that includes the at least first audio source that is amplified.

Clause 14B includes method of clause 1B, wherein the constraint includes scaling the soundfield, at the different time segments by a scaling factor, wherein application of the scaling factor attenuates at least a first audio source in the soundfield represented by the untransformed ambisonic coefficients at the different time segments, and the transformed ambisonic coefficients at the different time segments represent a modified soundfield, at the different time segments, that includes the at least first audio source that is attenuated.

Clause 15B includes method of clause 1B, wherein the constraint includes transforming the un-transformed ambisonic coefficients, captured by microphone positions of a non-ideal microphone array, at the different time segments, into the transformed ambisonic coefficients at the different time segments, that represent a modified soundfield at the different time segments, as if the transformed ambisonic coefficients, had been captured by microphone positions of an ideal microphone array.

Clause 16B includes method of clause 15B, wherein the ideal microphone array includes 4 microphones.

Clause 17B includes method of clause 15B, wherein the ideal microphone array includes 32 microphones.

Clause 18B includes the method of clause 1B, wherein the constraint includes target order of transformed ambisonic coefficients.

Clause 19B includes the method of clause 1B, wherein the constraint includes microphone positions for a form factor.

Clause 20B includes the method of clause 19B, wherein the form factor is a handset.

Clause 21B includes the method of clause 19B, wherein the form factor is glasses.

Clause 22B includes the method of clause 19B, wherein the form factor is a VR headset or AR headset.

Clause 23B includes the method of clause 19B, wherein the form factor is an audio headset.

Clause 24B includes the method of clause 1B, wherein the transformed ambisonic coefficients are used by a first audio application that includes instructions that are executed by the one or more processors.

Clause 25B includes the method of clause 24B, wherein the first audio application includes compressing the transformed ambisonic coefficients at the different time segments and storing them in the memory.

Clause 26B includes the method of clause 25B, wherein compressed transformed ambisonic coefficients at the different time segments are transmitted over the air using a wireless link between the device and a remote device.

Clause 27B includes the method of clause 25B, wherein the first audio application further includes decompressing the compressed transformed ambisonic coefficients at the different time segments.

Clause 28B includes the method of clause 24B, wherein the first audio application includes rendering the transformed ambisonic coefficients at the different time segments.

Clause 29B includes the method of clause 28B, wherein the first audio application further includes performing keyword detection and controlling a device based on the keyword detection and the constraint.

Clause 30B includes the method of clause 28B, wherein the first audio application further includes performing direction detection and controlling a device based on the direction detection and the constraint.

Clause 31B includes the method of clause 28B, further comprising playing the transformed ambisonic coefficients, through loudspeakers, at the different time segments that were rendered by a renderer.

Clause 32B includes the method of clause 1B, further comprising storing the untransformed ambisonic coefficients in a buffer.

Clause 33B includes the method of clause 32B, further comprising capturing one or more audio sources, with a microphone array, that are represented by the untransformed ambisonic coefficients in the ambisonic coefficients buffer.

Clause 34B includes the method of clause 32B, wherein the untransformed ambisonic coefficients were generated by a content creator before operation of a device is initiated.

Clause 35B includes the method of clause 1B, wherein transformed ambisonic coefficients are stored in a memory, and the transformed ambisonic coefficients are decoded based on the constraint.

Clause 36B includes the method of clause 1B, wherein the method operates in a one or more processors that are included in a vehicle.

Clause 37B includes the method of clause 1B, wherein the method operates in a one or more processors that are included in an XR headset, VR headset, audio headset or XR glasses.

Clause 38B includes the method of clause 1B, further comprising converting microphone signals output of a non-ideal microphone array into the untransformed ambisonic coefficients.

Clause 39B includes the method of clause 1B, wherein the untransformed ambisonic coefficients represent an audio source with a spatial direction that includes a biasing error.

Clause 40B includes the method of clause 39B, wherein the constraint corrects the biasing error, and the transformed ambisonic coefficients output by the adaptive network represent the audio source without the biasing error.

According to Clause 1C, an apparatus comprising: means for storing untransformed ambisonic coefficients at different time segments; means for obtaining the untransformed ambisonic coefficients at the different time segments, where the untransformed ambisonic coefficients at the different time segments represent a soundfield at the different time segments; and means for applying one adaptive network, based on a constraint, to the untransformed ambisonic coefficients at the different time segments to generate transformed ambisonic coefficients at the different time segments, wherein the transformed ambisonic coefficients at the different time segments represent a modified soundfield at the different time segments, that was modified based on the constraint.

Clause 2C includes the apparatus of clause 1C, wherein the constraint includes means for preserving a spatial direction of one or more audio sources in the soundfield at the different time segments, and the transformed ambisonic coefficients at the different time segments, represent a modified soundfield at the different time segments, that includes the one or more audio sources with the preserved spatial direction.

Clause 3C includes the apparatus of clause 2C, further comprising means for compressing the transformed ambisonic coefficients, and further comprising a means for transmit the compressed transformed ambisonic coefficients over a transmit link.

Clause 4C includes the apparatus of clause 2C, further comprising means for receiving compressed transformed ambisonic coefficients, and further comprising uncompressing the transformed ambisonic coefficients.

Clause 5C includes the apparatus of clause 2C, further comprising means for converting the untransformed ambisonic coefficients, and the constraint includes preserving the spatial direction of one or more audio sources in the soundfield comes from a speaker zone in a vehicle.

Clause 6C includes the apparatus of clause 2C, further comprising an additional adaptive network, and an additional constraint input into the additional adaptive network configured to output additional transformed ambisonic coefficients, wherein the additional constraint includes preserving a different spatial direction than the constraint.

Clause 7C includes the apparatus of clause 6C, further comprising means for adding the additional transformed ambisonic coefficients and the transformed ambisonic coefficients.

Clause 8C includes the apparatus of clause 7C, further comprising means for rendering the transformed ambisonic coefficients in a first spatial direction and means for rendering the additional transformed ambisonic coefficients in a different spatial direction.

Clause 9C includes the apparatus of clause 8C, wherein the transformed ambisonic coefficients in the first spatial direction are rendered to produce sound in a privacy zone.

Clause 10C includes the apparatus of clause 9C, wherein the additional transformed ambisonic coefficients, represent a masking signal, in the different spatial direction are rendered to produce sound outside of the privacy zone.

Clause 11C includes the apparatus of clause 9C, wherein the sound in the privacy zone is louder than sound produced outside of the privacy zone.

Clause 12C includes the apparatus of clause 9C, wherein a privacy zone mode is activated in response to an incoming or an outgoing telephone call.

Clause 13C includes the apparatus of clause 1C, wherein the constraint includes means for scaling the soundfield, at the different time segments by a scaling factor, wherein application of the scaling factor amplifies at least a first audio source in the soundfield represented by the untransformed ambisonic coefficients at the different time segments, wherein the transformed ambisonic coefficients, at the different time segments, represent a modified soundfield at the different time segments, that includes the at least first audio source that is amplified.

Clause 14C includes the apparatus of clause 1C, wherein the constraint includes means for scaling the soundfield, at the different time segments by a scaling factor, wherein application of the scaling factor attenuates at least a first audio source in the soundfield represented by the untransformed ambisonic coefficients at the different time segments, and the transformed ambisonic coefficients at the different time segments represent a modified soundfield, at the different time segments, that includes the at least first audio source that is attenuated.

Clause 15C includes the apparatus of clause 1C, wherein the constraint includes means for transforming the untransformed ambisonic coefficients, captured by microphone positions of anon-ideal microphone array, at the different time segments, into the transformed ambisonic coefficients at the different time segments, that represent a modified soundfield at the different time segments, as if the transformed ambisonic coefficients, had been captured by microphone positions of an ideal microphone array.

Clause 16C includes the apparatus of clause 15C, wherein the ideal microphone array includes four microphones.

Clause 17C includes the apparatus of clause 15C, wherein the ideal microphone array includes thirty-two microphones.

Clause 18C includes the apparatus of clause 1C, wherein the constraint includes target order of transformed ambisonic coefficients.

Clause 19C includes the apparatus of clause 1C, wherein the constraint includes microphone positions for a form factor.

Clause 20C includes the apparatus of clause 19C, wherein the form factor is a handset.

Clause 21C includes the apparatus of clause 19C, wherein the form factor is glasses.

Clause 22C includes the apparatus of clause 19C, wherein the form factor is a VR headset.

Clause 23C includes the apparatus of clause 19C, wherein the form factor is an AR headset.

Clause 24C includes the apparatus of clause 1C, wherein the transformed ambisonic coefficients are used by a first audio application that includes instructions that are executed by the one or more processors.

Clause 25C includes the apparatus of clause 24C, wherein the first audio application includes means for compressing the transformed ambisonic coefficients at the different time segments and storing them in the memory.

Clause 26C includes the means for clause 25C. wherein compressed transformed ambisonic coefficients at the different time segments are transmitted over the air using a wireless link between the device and a remote device.

Clause 27C includes the apparatus of clause 25C, wherein the first audio application further includes means for decompressing the compressed transformed ambisonic coefficients at the different time segments.

Clause 28C includes the apparatus of clause 24C, wherein the first audio application includes means for rendering the transformed ambisonic coefficients at the different time segments.

Clause 29C includes the apparatus of clause 28C, wherein the first audio application further includes performing keyword detection and controlling a device based on the keyword detection and the constraint.

Clause 30C includes the apparatus of clause 28C, wherein the first audio application further includes performing direction detection and controlling a device based on the direction detection and the constraint.

Clause 31C includes the apparatus of clause 28C, further comprising playing the transformed ambisonic coefficients, through loudspeakers, at the different time segments that were rendered by a renderer.

Clause 32C includes the apparatus of clause 1C, further comprising storing the untransformed ambisonic coefficients in a buffer.

Clause 33C includes the apparatus of clause 32C, further comprising capturing one or more audio sources, with a microphone array, that are represented by the untransformed ambisonic coefficients in the ambisonic coefficients buffer.

Clause 34C includes the apparatus of clause 32C, wherein the untransformed ambisonic coefficients were generated by a content creator before operation of a device is initiated.

Clause 35C includes the apparatus of clause 1C, wherein transformed ambisonic coefficients are stored in a memory, and the transformed ambisonic coefficients are decoded based on the constraint.

Clause 36C includes the apparatus of clause 1C, wherein the method operates in a one or more processors that are included in a vehicle.

Clause 37C includes the method of clause 1C, wherein the method operates in a one or more processors that are included in an XR headset, VR headset, or XR glasses.

Clause 38C includes the apparatus of clause 1C, further comprising converting microphone signals output of a non-ideal microphone array into the untransformed ambisonic coefficients.

Clause 39C includes the apparatus of clause 1C, wherein the untransformed ambisonic coefficients represent an audio source with a spatial direction that includes a biasing error.

Clause 40C includes the apparatus of clause 39C, wherein the constraint corrects the biasing error, and the transformed ambisonic coefficients output by the adaptive network represent the audio source without the biasing error.

According to Clause 1D, a non-transitory computer-readable storage medium having stored thereon instructions that, when executed, cause one or more processors to: store untransformed ambisonic coefficients at different time segments; obtain the untransformed ambisonic coefficients at the different time segments, where the untransformed ambisonic coefficients at the different time segments represent a soundfield at the different time segments; and apply one adaptive network, based on a constraint, to the untransformed ambisonic coefficients at the different time segments to generate transformed ambisonic coefficients at the different time segments, wherein the transformed ambisonic coefficients at the different time segments represent a modified soundfield at the different time segments, that was modified based on the constraint.

Clause 1D includes the non-transitory computer-readable storage medium of clause 2D, including causing the one or more processors to perform any of the steps in the preceding clauses 2B-40B of this disclosure.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

a memory configured to store untransformed ambisonic coefficients at different time segments;

one or more processors configured to:

obtain the untransformed ambisonic coefficients at the different time segments, where the untransformed ambisonic coefficients at the different time segments represent a soundfield at the different time segments; and apply one adaptive network, based on a constraint that includes preservation of a spatial direction of one or more audio sources in the soundfield at the different time segments, to the untransformed ambisonic coefficients at the different time segments to generate transformed ambisonic coefficients at the different time segments, wherein the transformed ambisonic coefficients at the different time segments represent a modified soundfield at the different time segments that was modified based on the constraint;

apply an additional adaptive network, and an additional constraint input into the additional adaptive network configured to output additional transformed ambisonic coefficients, based on the additional constraint, wherein the additional constraint includes preservation of a different spatial direction than the spatial direction preserved by the constraint; and a renderer, configured to render the transformed ambisonic coefficients in a first spatial direction, and render the additional transformed ambisonic coefficients in a different spatial direction.

2. The device of claim 1, further comprising an encoder configured to compress the transformed ambisonic coefficients, and further comprising a transmitter, configured to transmit the compressed transformed ambisonic coefficients over a transmit link.

3. The device of claim 1, further comprising a receiver configured to receive compressed transformed ambisonic coefficients.

4. The device of claim 3, further comprising a decoder configured to uncompress the compressed transformed ambisonic coefficients.

5. The device of claim 1, further comprising a microphone array, configured to capture microphone signals that are converted to the untransformed ambisonic coefficients, and the constraint that includes the preservation of the spatial direction of one or more audio sources in the soundfield comes from a speaker zone in a vehicle.

6. The device of claim 1, further comprising a combiner, wherein the combiner is configured to linearly add the additional transformed ambisonic coefficients and the transformed ambisonic coefficients.

7. The device of claim 1 wherein the transformed ambisonic coefficients in the first spatial direction are rendered to produce sound in a privacy zone.

8. The device of claim 7, wherein the additional transformed ambisonic coefficients, in the different spatial direction, represent a masking signal, and are rendered to produce sound outside of the privacy zone.

9. The device of claim 7, wherein the sound in the privacy zone is louder than sound produced outside of the privacy zone.

10. The device of claim 7, wherein a privacy zone mode is activated in response to an incoming or an outgoing telephone call.

11. The device of claim 1, wherein the constraint includes scaling the soundfield, at the different time segments by a scaling factor, wherein application of the scaling factor amplifies at least a first audio source in the soundfield represented by the untransformed ambisonic coefficients at the different time segments, wherein the transformed ambisonic coefficients, at the different time segments, represent a modified soundfield at the different time segments, that includes the at least first audio source that is amplified.

12. The device of claim 1, wherein the constraint includes scaling the soundfield, at the different time segments by a scaling factor, wherein application of the scaling factor attenuates at least a first audio source in the soundfield represented by the untransformed ambisonic coefficients at the different time segments.

13. The device of claim 12, wherein the transformed ambisonic coefficients at the different time segments, represent a modified soundfield at the different time segments, that includes the at least first audio source that is attenuated.

14. The device of claim 1, the one or more processors convert microphone signals output captured at different microphone positions of a non-ideal microphone array into untransformed ambisonic coefficients based on performing a directivity adjustment.

15. The device of claim 14, wherein the constraint includes correcting a biasing error introduced by the directivity adjustment, and the transformed ambisonic coefficients output by the adaptive network represent the audio source without the biasing error.

16. The device of claim 14, wherein the untransformed ambisonic coefficients are transformed into transformed ambisonic coefficients based on the constraint of adjusting the microphone signals captured by a non-ideal microphone array as if the microphone signals had been captured by microphones at different positions of an ideal microphone array.

17. The device of claim 16, wherein the ideal microphone array includes four microphones or thirty-two microphones.

18. The device of claim 1, wherein the constraint includes target order of transformed ambisonic coefficients.

19. The device of claim 1, wherein the constraint includes microphone positions for a form factor.

20. The device of claim 19, wherein the form factor is a handset, glasses, VR headset, AR headset, another device integrated into a vehicle, or audio headset.

21. The device of claim 1, wherein the transformed ambisonic coefficients are used by a first audio application that includes instructions that are executed by the one or more processors.

22. The device of claim 21, wherein the first audio application includes compressing the transformed ambisonic coefficients at the different time segments and storing them in the memory.

23. The device of claim 22, wherein compressed transformed ambisonic coefficients at the different time segments are transmitted over the air using a wireless link between the device and a remote device.

24. The device of claim 21, wherein the first audio application further includes decompressing the compressed transformed ambisonic coefficients at the different time segments.

25. The device of claim 21, wherein the first audio application includes renderer that is configured to render the transformed ambisonic coefficients at the different time segments.

26. The device of claim 21, wherein the first audio application further includes a keyword detector, coupled to a device controller that is configured to control the device based on the constraint.

27. The device of claim 21, wherein the first audio application further includes a direction detector, coupled to a device controller that is configured to control the device based on the constraint.

28. The device of claim 1 further comprising one or more loudspeakers configured to play the transformed ambisonic coefficients at the different time segments that were rendered by the renderer.

29. The device of claim 1, wherein the device further comprises a microphone array configured to capture one or more audio sources that are represented by the untransformed ambisonic coefficients.

30. The device of claim 1, wherein transformed ambisonic coefficients are stored in the memory, and the device further comprises a decoder configured to decode the transformed ambisonic coefficients based on the constraint.

* * * * *